United States Patent
Van Wageningen et al.

(10) Patent No.: US 10,097,040 B2
(45) Date of Patent: Oct. 9, 2018

(54) THERMAL BARRIER FOR WIRELESS POWER TRANSFER

(71) Applicant: KONINKLIJKE PHILIPS N.V., Eindhoven (NL)

(72) Inventors: Andries Van Wageningen, Wijlre (NL); Wilhelmus Gerardus Maria Ettes, Leeuwarden (NL); Antonius Adriaan Maria Staring, Eindhoven (NL); Johannes Gerardus Fredericus Kablau, Eindhoven (NL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 190 days.

(21) Appl. No.: 15/027,838

(22) PCT Filed: Oct. 23, 2014

(86) PCT No.: PCT/EP2014/072702
§ 371 (c)(1),
(2) Date: Apr. 7, 2016

(87) PCT Pub. No.: WO2015/062947
PCT Pub. Date: May 7, 2015

(65) Prior Publication Data
US 2016/0294219 A1 Oct. 6, 2016

(30) Foreign Application Priority Data
Oct. 30, 2013 (EP) .................................. 13190789

(51) Int. Cl.
*H02J 5/00* (2016.01)
*H05B 6/12* (2006.01)
*H02J 50/12* (2016.01)
*H02J 50/50* (2016.01)
*H05B 6/06* (2006.01)

(52) U.S. Cl.
CPC .............. *H02J 50/12* (2016.02); *H02J 5/005* (2013.01); *H02J 50/50* (2016.02); *H05B 6/062* (2013.01);
(Continued)

(58) Field of Classification Search
CPC .. H02J 5/005; H02J 50/10; H02J 50/12; H02J 50/50; H05B 6/062; H05B 6/1236;
(Continued)

(56) References Cited

U.S. PATENT DOCUMENTS 3,742,179 A * 6/1973 Harnden, Jr. .......... H05B 6/062
219/501
4,996,405 A * 2/1991 Poumey ............... H05B 6/1236
219/622
(Continued)

FOREIGN PATENT DOCUMENTS

DE 102009058271 A1 6/2011
JP 03208287 A 9/1991
(Continued)

*Primary Examiner* — Levi Gannon

(57) ABSTRACT

A thermal barrier for a wireless power transfer system comprises a first surface area (807) for coupling to a power receiver (111) to be powered by a first electromagnetic signal and a second surface area (805) for coupling to a power transmitter (101) providing a second electromagnetic signal. The thermal barrier (801) further comprises a power repeater (803) with a resonance circuit including an inductor and a capacitor. The power repeater (803) is arranged to generate the first electromagnetic signal by concentrating energy of the second electromagnetic signal towards the first surface area (807). The thermal barrier may provide thermal protection of the power transmitter (101) without unacceptable impact on the power transfer operation.

16 Claims, 11 Drawing Sheets

(52) U.S. Cl.
CPC ....... *H05B 6/1236* (2013.01); *H05B 2213/07* (2013.01); *Y02B 40/123* (2013.01); *Y02B 40/126* (2013.01)

(58) Field of Classification Search
CPC .. H05B 2213/07; Y02B 40/12; Y02B 40/123; Y02B 40/126
USPC ......................................................... 307/104
See application file for complete search history.

(56) References Cited

U.S. PATENT DOCUMENTS

| | | | | |
|---|---|---|---|---|
| 9,842,684 B2* | 12/2017 | John | ............... | H01F 38/14 |
| 2009/0045681 A1 | 2/2009 | Drechsler et al. | | |
| 2010/0259401 A1* | 10/2010 | Azancot | ................. | H01F 38/14 340/657 |
| 2011/0304216 A1 | 12/2011 | Baarman | | |
| 2012/0235636 A1* | 9/2012 | Partovi | ................... | H02J 7/025 320/108 |
| 2015/0163864 A1* | 6/2015 | Baarman | ................ | H02J 5/005 99/358 |

FOREIGN PATENT DOCUMENTS

| | | |
|---|---|---|
| JP | 0794266 A | 4/1995 |
| WO | 2006120044 A2 | 11/2006 |
| WO | 2009091267 A2 | 7/2009 |
| WO | 2013035987 A1 | 3/2013 |
| WO | 2013086064 A1 | 6/2013 |
| WO | 2013103939 A1 | 7/2013 |

* cited by examiner

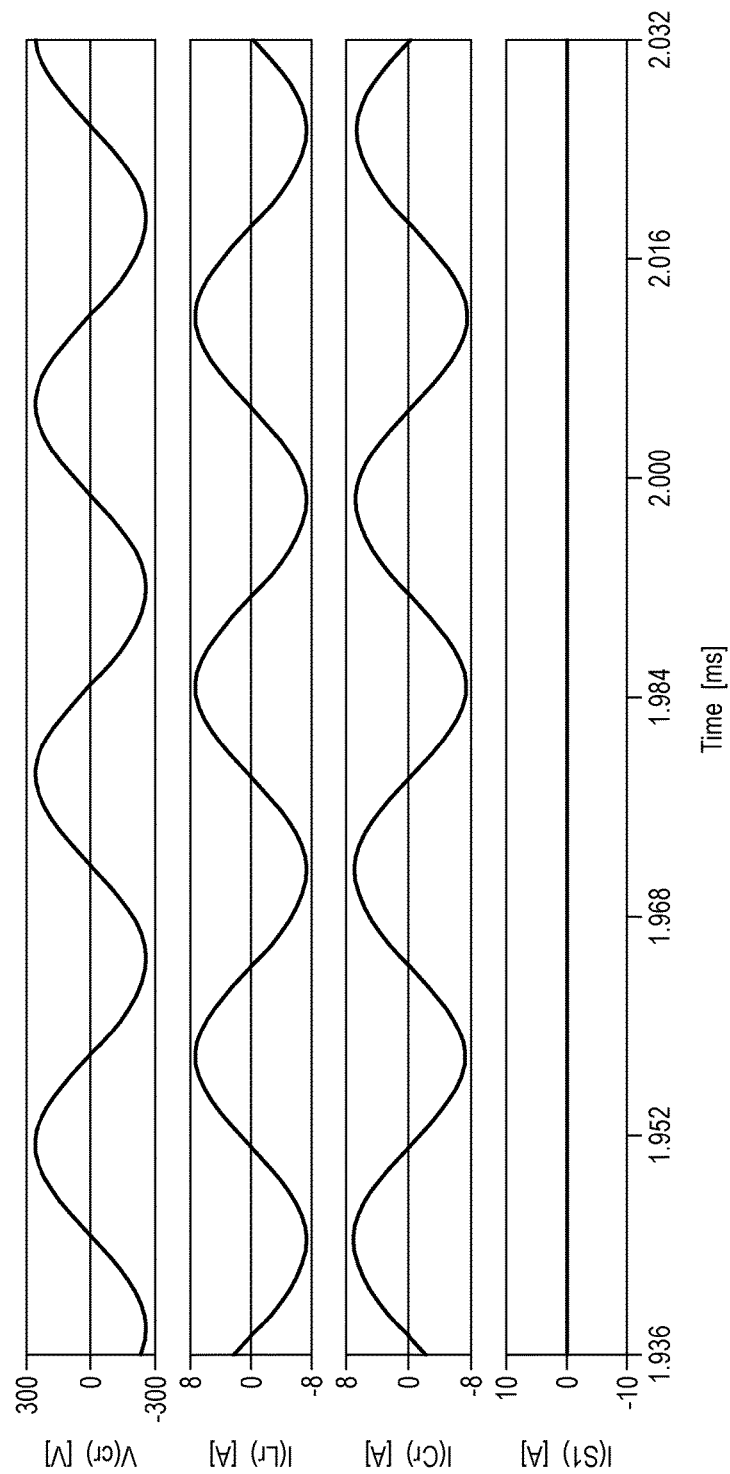
FIG. 13-I

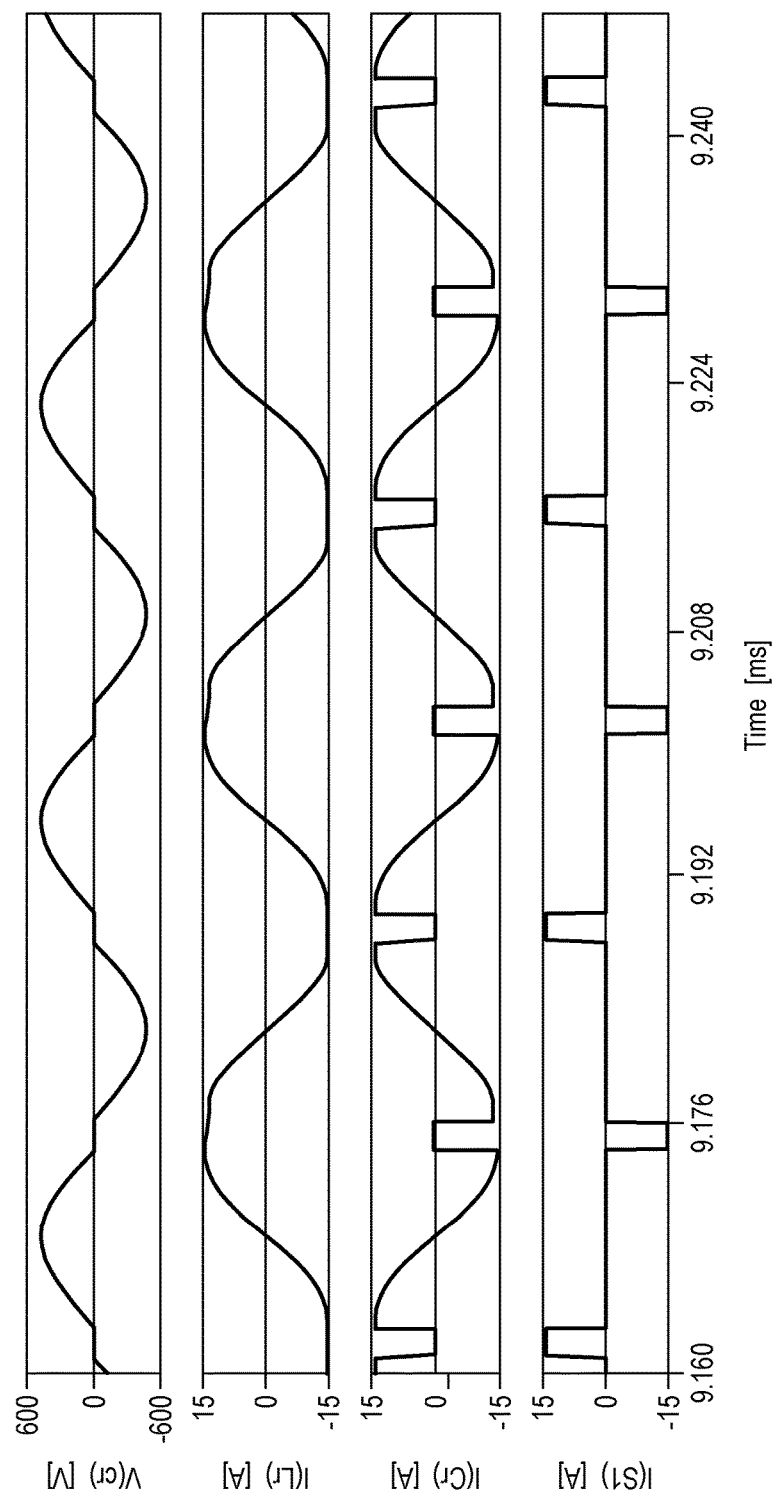
FIG.13-II

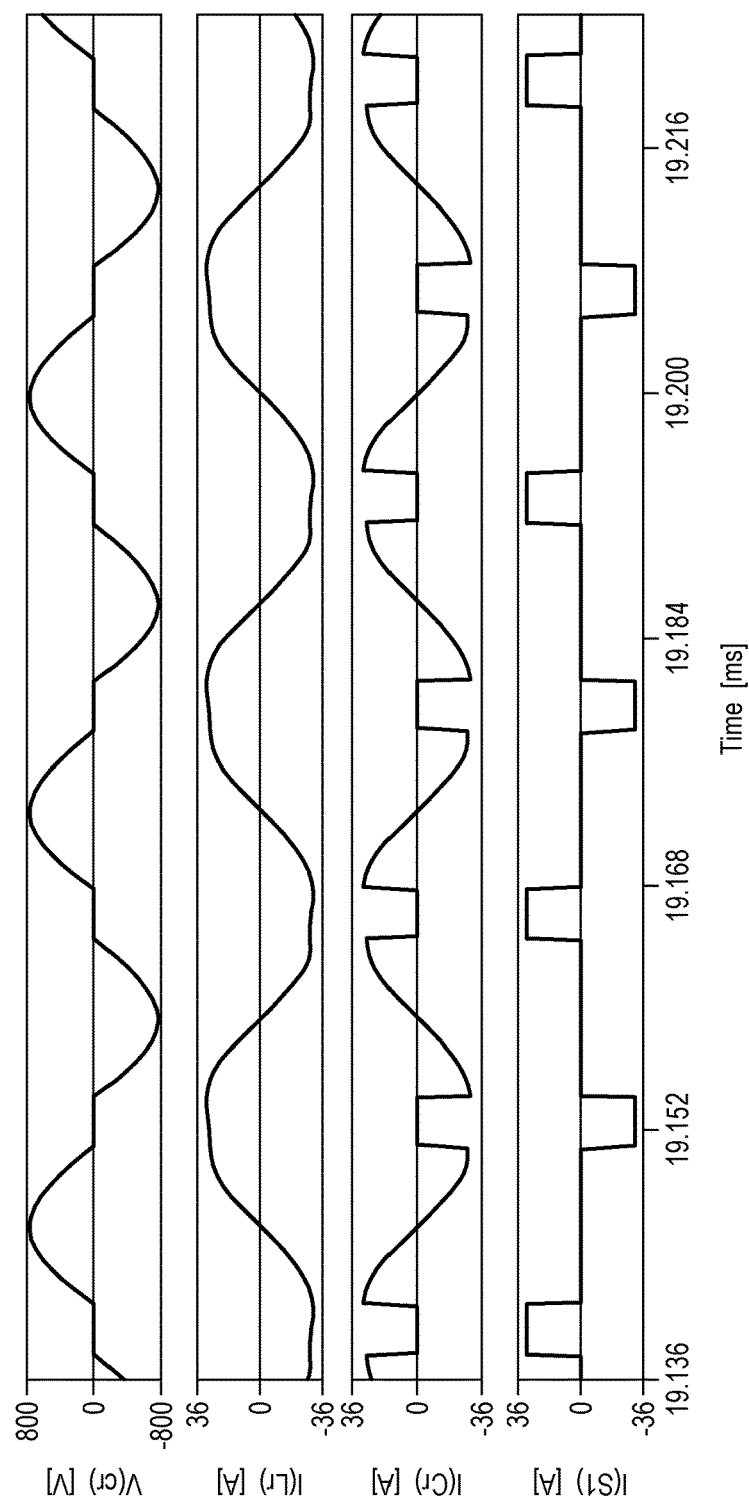
FIG.13-III

THERMAL BARRIER FOR WIRELESS POWER TRANSFER

CROSS-REFERENCE TO PRIOR APPLICATIONS

This application is the U.S. National Phase application under 35 U.S.C. § 371 of International Application No. PCT/EP2014/072702, filed on Oct. 23, 2014, which claims the benefit European Patent Application No. 13190789.1, filed on Oct. 30, 2013. These applications are hereby incorporated by reference herein.

FIELD OF THE INVENTION

The invention relates to wireless power transfer and in particular, but not exclusively, to wireless power transfer for heating appliances.

BACKGROUND OF THE INVENTION

Many systems require a wiring and/or electrical contacts in order to supply electrical power to devices. Omitting these wires and contacts provides for an improved user experience. Traditionally, this has been achieved using batteries located in the devices but this approach has a number of disadvantages including extra weight, bulk and the need to frequently replace or recharge the batteries. Recently, the approach of using wireless inductive power transfer has received increasing interest.

Part of this increased interest is due to the number and variety of portable and mobile devices having exploded in the last decade. For example, the use of mobile phones, tablets, media players etc. has become ubiquitous. Such devices are generally powered by internal batteries and the typical use scenario often requires recharging of batteries or direct wired powering of the device from an external power supply.

As mentioned, most present day devices require a wiring and/or explicit electrical contacts to be powered from an external power supply. However, this tends to be impractical and requires the user to physically insert connectors or otherwise establish a physical electrical contact. It also tends to be inconvenient to the user by introducing lengths of wire. Typically, power requirements also differ significantly, and currently most devices are provided with their own dedicated power supply resulting in a typical user having a large number of different power supplies with each power supply being dedicated to a specific device. Although, internal batteries may prevent the need for a wired connection to an external power supply, this approach only provides a partial solution as the batteries will need recharging (or replacing which is expensive). The use of batteries may also add substantially to the weight and potentially cost and size of the devices.

In order to provide a significantly improved user experience, it has been proposed to use a wireless power supply wherein power is inductively transferred from a transmitter coil in a power transmitter device to a receiver coil in the individual devices.

Power transmission via magnetic induction is a well-known concept, mostly applied in transformers which have a tight coupling between the primary transmitter coil and the secondary receiver coil. By separating the primary transmitter coil and the secondary receiver coil between two devices, wireless power transfer between the devices becomes possible based on the principle of a loosely coupled transformer.

Such an arrangement allows a wireless power transfer to the device without requiring any wires or physical electrical connections. Indeed, it may simply allow a device to be placed adjacent to, or on top of, the transmitter coil in order to be recharged or powered externally. For example, power transmitter devices may be arranged with a horizontal surface on which a device can simply be placed in order to be powered.

Furthermore, such wireless power transfer arrangements may advantageously be designed such that the power transmitter device can be used with a range of power receiver devices. In particular, a wireless power transfer approach known as the Qi Specification has been defined and is currently being developed further. This approach allows power transmitter devices that meet the Qi Specification to be used with power receiver devices that also meet the Qi Specification without these having to be from the same manufacturer or having to be dedicated to each other. The Qi Specification further includes some functionality for allowing the operation to be adapted to the specific power receiver device (e.g. dependent on the specific power drain).

The Qi Specification is developed by the Wireless Power Consortium and more information can e.g. be found on their website: http://www.wirelesspowerconsortium.com/index.html, where in particular the defined Specification documents can be found.

In order to support the interworking and interoperability of power transmitters and power receivers, it is preferable that these devices can communicate with each other, i.e. it is desirable if communication between the power transmitter and power receiver is supported, and preferably if communication is supported in both directions.

The Qi Specification supports communication from the power receiver to the power transmitter thereby enabling the power receiver to provide information that may allow the power transmitter to adapt to the specific power receiver. In the current Specification, a unidirectional communication link from the power receiver to the power transmitter has been defined and the approach is based on a philosophy of the power receiver being the controlling element. To prepare and control the power transfer between the power transmitter and the power receiver, the power receiver specifically communicates information to the power transmitter.

The Qi Specification is being developed to support increasingly high power demanding applications. For example, the Specification is intended to be used with devices consuming several kilowatts of power.

For example, the wireless power transfer is expected to increasingly be used with e.g. kitchen appliances such as kettles, blenders, food processors etc. In particular, wireless power transfer is envisaged to be used for providing power to various heating devices. For example, the concept is expected to be widely used e.g. in cooking stoves supporting kettles and pans that are heated by means of magnetic induction.

Indeed, it is envisaged that wireless power transfer may be used to provide flexible power in environments such as kitchens. In many scenarios, it is expected that the apparatus providing the wireless transfer may be designed to support both appliances that are used for heating as well as non-heating appliances. Accordingly, the apparatus providing the wireless transfer may be designed to e.g. have different areas or surfaces that have different thermal resistance. E.g., some areas may be designed to receive a heating element whereas other areas may be intended for non-heating appliances.

As a specific example, a kitchen apparatus for providing wireless power may provide a surface (such as a kitchen table top) having an area designed to power heating appliances, such as kettles and pans, and a second area designed to provide power to non-heating appliances, such as blenders or food processors. Accordingly, one area may be made from a material with a high thermal robustness, whereas another area may be made from a material which is vulnerable to high temperatures.

As an example, FIG. 1 illustrates an example of a wireless power provision to a non-heating appliance and FIG. 2 illustrates an example of a wireless power provision to a heating appliance (such as a pan or a kettle).

In the examples, the power providing apparatus comprises a power transmitter 101 which is shown as being subdivided into a power source 103, a transmitter coil 105, and an inverter 107 receiving power from the power source 103 and generating a drive signal for the transmitter coil 105. The transmitter coil 105 is located close to or integrated within a kitchen worktop 109. A non-heating kitchen appliance 111 is positioned on the worktop in the example of FIG. 1 and a heating appliance 111, such as a kettle is positioned on the worktop in the example of FIG. 2. The heating appliance 111 of FIG. 2 has a heating element 201 in which the power transmitter 101 may induce eddy currents which result in the heating element heating up.

In the example, the worktop 109 may be divided into a cooking zone illustrated by FIG. 2 and a food preparation zone illustrated by FIG. 1. In the example, the cooking zone may comprise an induction cooking plate which heats e.g. a kettle or a pan by magnetic induction. The bottom of the pan or kettle may get very hot and the cooking zone may be arranged to withstand such temperatures. E.g., a ceramic cooking plate can withstand a temperature of 200 C.° or more.

Likewise, the preparation zone may comprise a power transmitter integrated in the worktop in order to power appliances. However, for this area, the material used is typically not resistant to high temperatures. For example, typical kitchen worktops may be made from materials such as wood or granite. However, these materials may have a much lower heat resistance and may be damaged if subjected to the high temperatures of the kettle.

Having both wireless power transmitters in the cooking zone and in the preparation zone may result in concerns about the expected user behavior. A user will expect a pan to become hot when it is on a cooking stove. However, he may also desire to use the power transmitter of the preparation zone for powering the heating appliance. However, this can result in damage to the worktop caused by the high temperatures. Indeed, many appliances that include heating are now perceived to belong more to the preparation zone than a cooking zone. For example, appliances such as toasters, water kettles, rice cookers, etc. are nowadays typically used on the kitchen worktop rather than on the stove. It is expected that the functions provided by the cooking zone and the preparation zone will continue to increasingly merge.

Thus, a potential problem arises if the power transmitter of the preparation zone generates an alternating magnetic flux field that may be received by a heating appliance, for instance a water kettle or a frying pan. This may cause the underside of the pan or kettle to become very hot (typically due to the generation of Eddy currents in the heating plate or element). The generated heat may result in damage to the worktop.

Furthermore, although the heating appliance may typically be arranged to control the temperature of the heating element, e.g. by controlling the power of the power transfer signal, a fault or error scenario could potentially result in undesirably high temperatures which could potentially result in damage to the surface. For example, temperature control using the power control loop to adjust the power of the power transfer signal requires reliable communication between the power receiver and the power transmitter. If communication errors occur, or indeed if the communication link is lost, the temperature may be unregulated and could result in temperatures that are too high. Such a scenario may occur if the power transmitter is positioned on a coaster or trivet in order to protect the surface. Such an arrangement will inherently result in an increased distance between the transmitter and receiver coils and this could result in an unreliable load modulation communication.

Undesirable temperatures could e.g. also result from faults occurring in the heating appliance. For example, a faulty temperature sensor could result in the temperature in a heating plate in which the power transfer signal induces eddy currents, and thus heating, always being measured below the target temperature. As a result, the power receiver will continue to request increased power from the power transmitter resulting in the temperature of the heating plate increasing beyond the desirable levels.

More generally, the increased flexibility and variation of applications of wireless power transfer at increasingly high power levels, where in particular the power transfer may support heated power consuming devices, has led to increased risks and complications. This may in particular be the case for kitchen scenarios using wireless power transfer but is not limited to such applications.

Hence, an improved wireless power transfer approach would be advantageous and in particular an approach allowing increased flexibility, reduced risk of damage, improved support for different applications and usage scenarios, additional safety and in particular additional or improved overheating protection, facilitated user operation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a thermal barrier for a wireless power transfer system, the thermal barrier comprising: a first surface area for coupling to a power receiver to be powered by a first electromagnetic signal; a second surface area for coupling to a power transmitter providing a second electromagnetic signal; and a power repeater comprising a resonance circuit including an inductor and a capacitor, the power repeater being arranged to generate the first electromagnetic signal by concentrating energy of the second electromagnetic signal towards the first surface area; a receiver for receiving a temperature measurement; and a controller for controlling a first level of the first electromagnetic signal by adapting a property of the resonance circuit, the controller being arranged to reduce the first level for increasing values of the temperature measurement.

The invention may allow e.g. devices heated by wireless power transfer to be used with wireless power transmitters associated with insufficient thermal protection while at the same time ensuring efficient power transfer.

In particular, using a conventional thermal barrier will in most scenarios result in a substantially degraded power transfer performance due to the increased distance and reduced coupling between the transmit coil of the power transmitter and the receive element (coil/heating element) of the power receiver. The invention may allow the thermal barrier to provide efficient thermal protection by allowing an increased distance between the transmit coil and receive coil while still ensuring an efficient effective coupling between the transmit coil and the receive coil. In particular, the resonance circuit may concentrate the magnetic field such that an increased flux passes through the power receiver receive element (coil/heating element). The resonance circuit may concentrate the energy towards the first surface area by guiding, biasing or moving magnetic field lines from the second electromagnetic signal towards the first surface area. The resonance circuit may effectively function as a magnetic lens. Specifically, it may deform the magnetic field from the power transmitter to provide an increased flux through the first surface area/the receiver receive element of the power receiver.

The invention may further introduce a temperature control or protection which may be independent of the power transmitter. Indeed, the thermal barrier may in many embodiments provide an additional temperature control and protection which for example may prevent overheating for a heating appliance being powered by the power transmitter even if an error or fault occurs.

For example, a heating plate may be powered by the power transfer signal and the temperature may be controlled by a power control loop from the power receiver to the power transmitter. However, if a fault occurs in e.g. the power or temperature control functionality of the power transmitter or the power receiver, this may result in the power transfer signal not being controlled appropriately and may result in the power transfer signal being too strong for the desired temperature. This could result in the temperature increasing and potentially could result in damage. However, if the barrier is provided with temperature measurements reflecting the temperature of e.g. the heating element, such a temperature increase or even run-away may be detected and the thermal barrier may in such a scenario proceed to reduce the power and thus the resulting temperature. The thermal barrier may in many embodiments provide an extra safety feature, and specifically may introduce additional overheating protection. The approach may thus reduce the risk of a single point failure resulting in overheating and potential damage.

In many embodiments, the approach may allow a more efficient and typically faster temperature control/protection. Specifically, conventional temperature regulation, wherein the power receiver controls the power level of the power transfer signal from the power transmitter, is relatively slow (and is typically limited by the low update frequency of the power control loop).

The approach may provide an enhanced user experience and may for example allow the thermal barrier to control the thermal operating point, and specifically it may allow the thermal barrier to detect and address e.g. overheating scenarios. The invention may allow improved flexibility and support for an increased variety of different usage scenarios for wireless power transfer. For example, it may provide improved support for e.g. kitchen usage scenarios wherein a wireless power transmitter may be provided in a worktop made from non-thermally resistant materials.

In some embodiments, the thermal barrier may comprise a plurality of resonance circuits, e.g. with the inductors being distributed between the first surface area and the second surface area.

The first surface area and the second surface area may be on opposing (and possibly substantially parallel) surfaces of the thermal barrier.

The first surface area may specifically be arranged to couple to the power receiver by being arranged to receive the power receiver. The first surface area may be arranged to touch, attach, connect to, or rest on a surface of the power receiver, or may provide a surface area for the power receiver to be positioned on.

The second surface area may specifically be arranged to couple to the power transmitter by being arranged to receive the power transmitter. The first surface area may be arranged to touch, attach, connect to, or rest on a surface of the power receiver, or may provide a surface area for the power transmitter to be positioned on.

The power receiver may in some embodiments comprise or consist in a conductive element, and specifically a conductive heating element. Specifically, the power may be received by the first electromagnetic signal causing Eddy currents in the conductive element.

The first level of the first electromagnetic signal may e.g. be a flux level, a flux density level, or a power level.

In some embodiments, the controller may be arranged to control the first level to provide a desired absolute, incremental, or relative relationship with the temperature measurement, and specifically the controller may be arranged to increase or decrease the first level depending on the temperature measurement.

In some embodiments, the controller may be arranged to control a maximum value of the first level to provide a desired relationship with the temperature measurement, and specifically the controller may be arranged to increase or decrease the maximum value depending on the temperature measurement.

The relationship between the first level or a maximum value of the first level and the temperature measurement may be a non-linear relationship. The relationship between the first level or a maximum value of the first level, and the temperature measurement may be a piecewise linear relationship. The relationship between the first level or a maximum value of the first level and the temperature measurement may be a monotonically decreasing relationship (the first level or maximum value of the first level may be a monotonically decreasing function of the temperature measurement).

The temperature measurement may be a value indicative of a measured temperature such that increasing values indicate increasing temperatures. The measured temperature may be a temperature of an element of the power receiver/appliance powered by the power receiver, and specifically may be a temperature of a heating element heated by the first electromagnetic signal.

In accordance with an optional feature of the invention, the controller is arranged to compare the temperature measurement to a temperature threshold, and to reduce the first level if the temperature measurement exceeds the temperature threshold This may provide advantageous and low complexity operation in many embodiments. The feature may in particular provide an efficient overheating protection in many embodiments. Specifically, if the temperature measurement indicates a temperature which exceeds a safe threshold, the controller may proceed to reduce the level of the first electromagnetic signal. E.g., the controller may short cut a capacitor of the resonance circuit thereby changing the resonance operation of the resonance circuit and effectively blocking the electromagnetic flux to the power receiver.

In accordance with an optional feature of the invention, the controller is arranged to restrict the first level to not exceed a maximum allowable level, and to reduce the maximum allowable level in response to an increasing value of the temperature measurement.

The controller may reduce the first level by reducing a maximum allowable level for the first electromagnetic signal. Thus, e.g. power control may be allowed as long as the maximum allowable level is not exceeded. However, by reducing the maximum allowable level for higher temperatures, the first level is reduced relative to the level that would result if the temperature was lower.

In accordance with an optional feature of the invention, the controller is arranged to compare the temperature measurement to a temperature threshold, and to set the maximum allowable level to lower value when the temperature measurement exceeds the temperature threshold than when the temperature measurement does not exceed the temperature threshold.

This may provide advantageous and low complexity operation in many embodiments. The feature may in particular provide efficient overheating protection in many embodiments. Specifically, if the temperature measurement indicates a temperature that exceeds a safe threshold, the controller may proceed to reduce the level of the first electromagnetic signal. E.g., the controller may short cut a capacitor of the resonance circuit power transfer to the power receiver thereby changing the resonance operation of the resonance circuit and effectively blocking the electromagnetic flux to the power receiver.

In many embodiments, the maximum allowable level when the temperature measurement exceeds the temperature threshold is no more than 5 W, 2 W or even 1 W for many lower power applications, and often advantageously no more than 10 W, 50 W, 100 W or 200 W for high power applications.

The maximum allowed level of the first signal when the temperature measurement exceeds the threshold may depend on preferences and requirements of the individual embodiment, application and scenario. Indeed, the preferred value may depend on the thermal behavior of the appliance comprising the power receiver and may e.g. be determined by the designer of the appliance. It may be a relative high level when the appliance can convey the heat to the air. It may be a relatively low level when the appliance insulates the heat to the environment. The maximum allowable level when the temperature measurement exceeds the threshold may in many embodiments be set to a level that allows the control functionality of the power receiver to be powered by the first electromagnetic signal.

In accordance with an optional feature of the invention, the maximum allowable level when the temperature measurement exceeds the temperature threshold is no more than 10% (or e.g. 5-10%) of the maximum allowable level when the temperature measurement does not exceed the temperature threshold.

The approach may provide efficient protection against e.g. overheating. The controller may be arrange to reduce the level of the first electromagnetic signal fed to the power receiver to very low levels compared to normal operation. In many embodiments, the maximum level when the temperature exceeds the threshold may be reduced to levels that prevent excessive heating to occur. For example, the maximum allowable level may be set such that it is sufficient for powering the internal control functionality of the power receiver but not a heating load (in most applications, the maximum allowable level may in such embodiments be around 1-10 W as this is typically sufficient for powering of the internal functionality).

In accordance with an optional feature of the invention, the controller is arranged to reduce the level by changing a resonance frequency of the resonance circuit to increasingly differ from at least one of a frequency of the second electromagnetic signal, a resonance frequency of a resonance circuit of a power transmitter, and a resonance frequency of a resonance circuit of the power receiver for increasing values of the temperature measurement.

This may provide efficient and low complexity operation in many embodiments.

In accordance with an optional feature of the invention, the receiver is arranged to receive the temperature measurement from the power receiver.

This may provide efficient operation in many embodiments, and may e.g. allow for the control of the first level to be based on temperature measurements that accurately reflect the measurement of an element of the device being powered, such as specifically the temperature of the heating element.

In accordance with an optional feature of the invention, the thermal barrier further comprises a temperature sensor arranged to generate the temperature measurement. Specifically, in many embodiments the thermal barrier may comprise a temperature sensor arranged to generate the temperature measurement to be indicative of a temperature of the first surface area and/or an area touching the power receiver during operation.

The approach may allow the thermal barrier to provide a self contained temperature control/protection functionality which may provide additional operational and/or safety without requiring any specific function or operation on behalf of the power receiver. The approach may provide efficient backwards compatibility and may allow the thermal barrier to be used with a range of different power receivers while providing e.g. overheating protection.

In accordance with an optional feature of the invention, the controller is arranged to change the property to reduce the ratio between a second level of the second electromagnetic signal and the first level of the first electromagnetic signal for increasing values of the temperature measurement.

This may provide efficient control of the inductive power provided to the power receiver.

In accordance with an optional feature of the invention, the controller is arranged to reduce the first level by reducing a magnetic flux density of the first electromagnetic signal for the first surface area relative to a magnetic flux density of the second electromagnetic signal for the second surface area for increasing values of the temperature measurement.

This may provide efficient control of the inductive power provided to the power receiver.

The resonance circuit may specifically be modified to reduce the power level of the first electromagnetic signal reaching a receive coil of the power receiver, i.e. it may be adapted to reduce the magnetic flux passing through the receive coil of the power receiver. The feature may for example allow the resonance circuit to be adapted such that the energy of the second electromagnetic signal is spread or concentrated away from the first surface area (and the receive coil of the power receiver).

The adaptation may for example be achieved by modifying a property of the capacitance, inductance, or the resistance of the resonance circuit.

In accordance with an optional feature of the invention, the property is a resonance frequency.

This may provide an efficient way of controlling power provision to the power receiver, and may in particular provide an efficient means of regulating the power level or ensuring that it is restricted to a given level. For example, if a fault is detected by the power receiver, it may request the maximum power level to be restricted by the thermal barrier. This may in many scenarios result in faster reaction times than for the power receiver to communicate with the power transmitter to restrict power. The approach may in many embodiments provide additional protection against e.g. faults or errors in communication between the power receiver and the power transmitter.

Adapting the resonance frequency may provide accurate and efficient control in many embodiments, and may specifically allow a relatively accurate and gradual control.

The resonance frequency may be modified by modifying a capacitance of the capacitor and/or an inductance of the inductor.

In accordance with an optional feature of the invention, the controller is arranged to change the resonance frequency by at least one of short circuiting the capacitor and disconnecting the capacitor from the inductor.

In some embodiments, the resonance frequency may effectively be changed to zero by the capacitor being disconnected or short-circuited. This may be particularly advantageous in many scenarios as it may allow low complexity adaptation and/or may increase or maximize the reduction in energy of the signal reaching the power receiver.

In accordance with an optional feature of the invention, the thermal barrier further comprises a receiver coupled to the controller and arranged to receive control data from the power receiver; and wherein the controller is arranged to adapt the property in dependence on the control data.

This may allow improved performance in many embodiments. For example, it may in many embodiments allow the power receiver to quickly and efficiently restrict the power to the power receiver in scenarios wherein the power receiver detects an undesirable operation (e.g. a fault or undesired use scenario).

In accordance with an optional feature of the invention, the thermal barrier comprises a user interface coupled to the controller and arranged to receive a user input; and wherein the controller is arranged to adapt the property in dependence on the user input.

The approach may provide an enhanced user experience and may for example allow the use of a thermal barrier to provide functionality not supported by the power receiver itself.

As mentioned, the thermal barrier may further comprise a temperature sensor coupled to the controller and arranged to measure a temperature; and the controller is arranged to adapt the property in dependence on the temperature.

The approach may provide an enhanced user experience and may for example allow the thermal barrier to control the thermal operating point, and specifically it may allow the thermal barrier to detect and address e.g. overheating scenarios.

For example, if the temperature sensor detects a temperature above a given target threshold it may proceed to detune the resonance circuit to reduce the temperature accordingly. For example, if overheating is detected, the controller may short circuit or disconnect the capacitor.

The temperature sensor may specifically be positioned proximal to the first surface area or the second surface area.

In accordance with an optional feature of the invention, the thermal barrier further comprises a controller for adapting a resonance frequency of the resonance circuit to match a frequency of the second electromagnetic signal.

This may provide improved power transfer and may specifically allow an improved concentration of energy towards the first surface area. The resonance frequency may for example be adjusted to maximize a peak or averaged current through, or voltage over, the inductor.

In accordance with an optional feature of the invention, the thermal barrier is detachable from the power transmitter and the power receiver.

The thermal barrier may be a separate physical entity from the power receiver and power transmitter. The feature may allow improved or additional usage scenarios. For example, the thermal barrier may be a separate barrier that can be positioned on a power transmitter when this is used to provide power to a heating appliance while allowing the power transmitter to be used directly with power receivers that do not include any heating functionality.

In accordance with an optional feature of the invention, the thermal barrier further comprises a communication unit arranged to transmit data to the power transmitter by modifying a property of the resonance circuit.

This may allow efficient communication and allow increased flexibility and functionality.

The property may specifically be an inductance, capacitance, or resistance of the resonance circuit.

In accordance with an optional feature of the invention, the thermal barrier further comprises a user interface for receiving a user input; and a communication unit for generating data in dependence on the user input and at least one parameter measured by the thermal barrier.

This may allow efficient communication and allow increased flexibility and functionality.

In many embodiments, the thermal barrier further comprises a controller for modifying a resonance frequency of the resonance circuit by for at least some cycles of the second electromagnetic signal by at least one of short circuiting the capacitor and disconnecting the capacitor from the inductor for part of the cycle.

This may provide a particularly efficient approach of adapting the resonance frequency of the resonance circuit. The approach may allow a relatively fine adjustment and may e.g. be used to modify the resonance frequency for the purpose of e.g. communication, adapting to the second electromagnetic signal, or regulating power to the power receiver.

In many embodiments, a distance between the first surface area and the second surface area is at least 1 cm.

The invention may provide improved power transfer while allowing a thermal barrier with a significant depth to provide thermal insulation and protection. An increased distance between the surfaces coupling to the power transmitter and the power receiver respectively allows increased thermal insulation and protection. The power repeater may allow the power transfer to remain efficient, and may specifically allow an effective energy coupling between the power transmitter and the power receiver.

In some embodiments, the distance between the first surface area and the second surface area is at least 2 cm, 3 cm or even 5 cm.

In accordance with some embodiments, there is provided a power receiver for a wireless power transfer system comprising a thermal barrier, the thermal barrier comprising: a first surface area for coupling to a power receiver to be powered by a first electromagnetic signal; a second surface area for coupling to a power transmitter providing a second electromagnetic signal; and a power repeater comprising a resonance circuit including an inductor and a capacitor, the power repeater being arranged to generate the first electromagnetic signal by concentrating energy of the second electromagnetic signal towards the first surface area.

In many embodiments, the thermal barrier may advantageously be part of the power receiver. A single device, such as an appliance, may comprise both the power receiver and the thermal barrier which typically may allow the appliance/device to be brought into contact with materials that are not heat resistant.

A power transmitter for transferring power to a power receiver using an electromagnetic power signal may comprise: an inductor for providing the electromagnetic power signal in response to a drive signal fed to the inductor; a power signal generator for generating the drive signal for the inductor; and a detector for detecting a presence of a thermal barrier; and a power controller for restricting a power of the wireless inductive power signal to a lower level when the thermal barrier has not been detected than when the thermal barrier has been detected.

This may provide improved functionality and/or operation in many scenarios. In particular, it may reduce the risk of e.g. damage caused by a power receiver supporting a heating function.

The detector may be arranged to detect the presence of the thermal barrier in response to detecting a signal originating from the thermal barrier.

This may allow low complexity yet efficient detection.

The detector may be coupled to the inductor and is arranged to detect the presence of a thermal barrier by sensing a change in a characteristics for the inductor.

Specifically, the detector may detect a change in impedance corresponding to the presence of the resonance circuit of the thermal barrier.

The detector may be arranged to detect the presence of the thermal barrier based on a property of the drive signal for the inductor. E.g. the detector may detect that the inductor provides an impedance with specific characteristic over a certain frequency interval. The specific characteristic may correspond to that resulting from a resonance circuit in a thermal barrier.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 13 is an illustration of some voltage waveforms of a power receiver of a wireless power transfer system in accordance with some embodiments of the invention.

DETAILED DESCRIPTION OF SOME EMBODIMENTS OF THE INVENTION

The following description focuses on embodiments of the invention applicable to a kitchen application, and in particular to a mixed cooking and preparation zone kitchen environment using wireless power transfer. However, it will be appreciated that the invention is not limited to this application but may be applied to many other applications and wireless power transfer systems.

Figure 3:
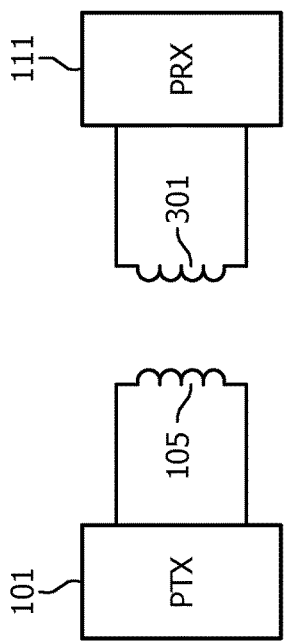
FIG. 3 is an illustration of a wireless power transfer system.

FIG. 3 illustrates an example of a power transfer system in accordance with some embodiments of the invention. The power transfer system comprises a power transmitter 101 which includes (or is coupled to) a transmitter coil/inductor 105. The system further comprises a power receiver 111 which includes (or is coupled to) a receiver coil/inductor 101. The receiver coil/inductor may in some embodiments be a conductive element such as specifically a heating element, i.e. it may be anything in which an electrical signal is induced when exposed to a varying magnetic field.

The system provides a wireless inductive power transfer from the power transmitter 101 to the power receiver 111. Specifically, the power transmitter 101 generates a power signal which is propagated as a magnetic flux by the transmitter coil 105. The power signal may typically have a frequency between around 20 kHz to 200 kHz. The transmitter coil 105 and the receiver coil 301 are loosely coupled and thus the receiver coil 301 picks up (at least part of) the power signal from the power transmitter 101. Thus, the power is transferred from the power transmitter 101 to the power receiver 111 via a wireless inductive coupling from the transmitter coil 105 to the receiver coil 301. The term power signal may be used to refer to the magnetic or inductive signal between the transmitter coil 105 and the receiver coil 301 (the magnetic flux signal), but it will be appreciated that by equivalence it may also be considered and used as a reference to the electrical signal provided to the transmitter coil 105, or indeed to the electrical signal of the receiver coil 301.

In the following, the operation of the power transmitter 101 and the power receiver 111 will be described with specific reference to an embodiment in accordance with the Qi Specification (except for the herein described (or consequential) modifications and enhancements). In particular, the power transmitter 101 and the power receiver 111 may substantially be compatible with the Qi Specification version 1.0 or 1.1 (except for the herein described (or consequential) modifications and enhancements).

To control the power transfer, the system may proceed via different phases, in particular a selection phase, a ping phase, an identification and configuration phase, and a power transfer phase. More information can be found in chapter 5 of part 1 of the Qi wireless power specification.

Initially, the power transmitter 101 is in the selection phase wherein it merely monitors for the potential presence of a power receiver. The power transmitter 101 may use a variety of methods for this purpose, e.g. as described in the Qi wireless power specification. If such a potential presence is detected, the power transmitter 101 enters the ping phase wherein a power signal is temporarily generated. The power receiver 111 can apply the received signal to power up its electronics. After receiving the power signal, the power receiver 111 communicates an initial packet to the power transmitter 101. Specifically, a signal strength packet indicating the degree of coupling between power transmitter and power receiver is transmitted. More information can be found in chapter 6.3.1 of part 1 of the Qi wireless power specification. Thus, in the Ping phase it is determined whether a power receiver 111 is present at the interface of the power transmitter 101.

Upon receiving the signal strength message, the power transmitter 101 moves into the Identification & Configuration phase. In this phase, the power receiver 111 keeps its output load disconnected and communicates to the power transmitter 101 using load modulation. The power transmitter provides a power signal of constant amplitude, frequency and phase for this purpose (with the exception of the change caused by load-modulation). The messages are used by the power transmitter 101 to configure itself as requested by the power receiver 111. The messages from the power receiver 111 are not communicated continuously but are communicated in intervals.

Following the Identification and Configuration phase, the system moves on to the power transfer phase where the actual power transfer takes place. Specifically, after having communicated its power requirement, the power receiver 111 connects the output load and supplies it with the received power. The power receiver 111 monitors the output load and measures the control error between the actual value and the desired value of a certain operating point. It communicates such control errors to the power transmitter 101 at a minimum rate of e.g. every 250 ms to indicate these errors to the power transmitter 101 as well as the desire for a change, or no change, of the power signal. Thus, in the power transfer phase, the power receiver 111 also performs load modulation of the power signal in load modulation intervals in order to communicate information to the power transmitter 101. It will be appreciated that other communication approaches may alternatively or additionally be used.

Figure 1:
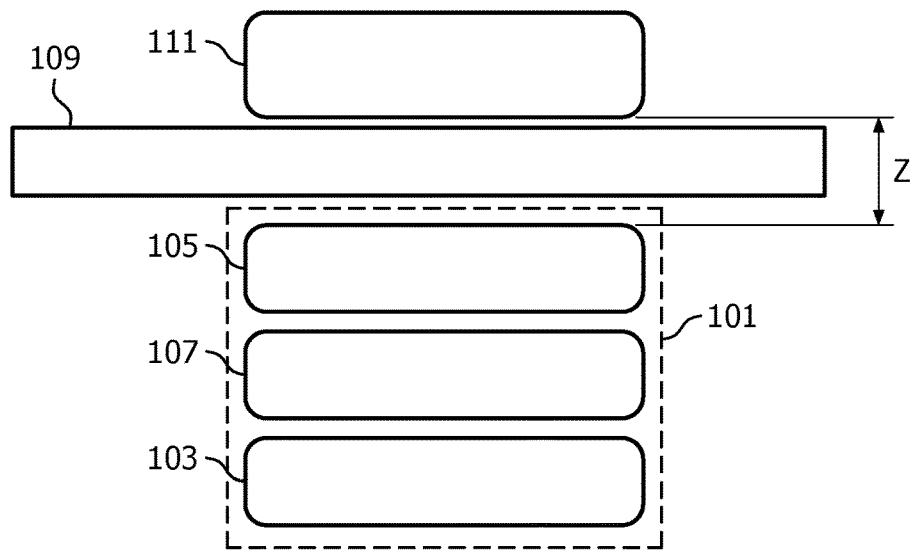
FIG. 1 is an illustration of a wireless power transfer system.
Figure 2:
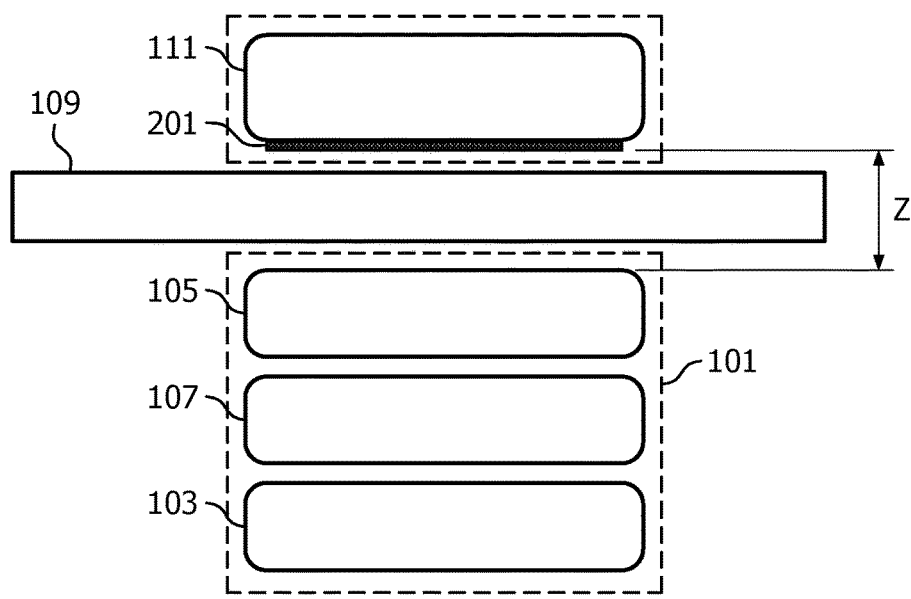
FIG. 2 is an illustration of a wireless power transfer system.
Figure 4:
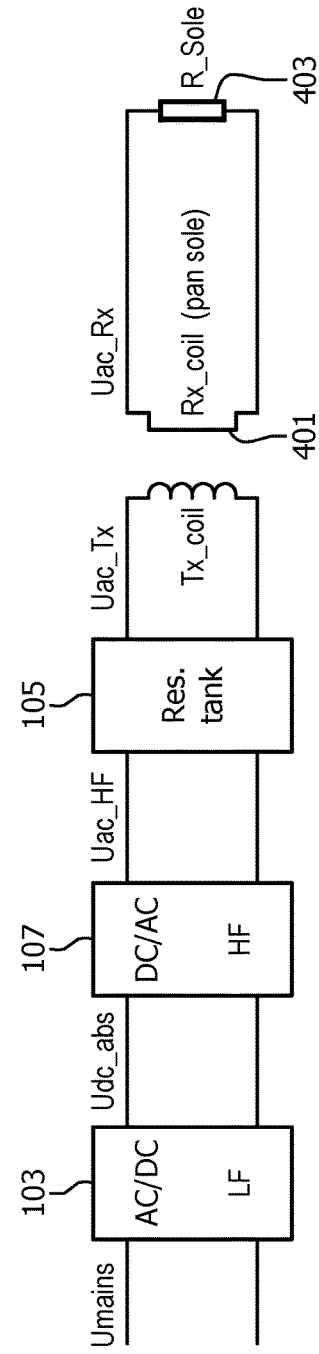
FIG. 4 is an illustration of a power path of a wireless power transfer system.

FIG. 4 illustrates an example of a power supply path for typical induction heating appliance, such as e.g. that of FIGS. 1 and 2. The power provision comprises a power source 103 in the form of an AC/DC converter which rectifies the input ac voltage (e.g. the mains). The rectified mains signal is fed to a DC/AC converter in the form of an inverter 107 which generates a high frequency drive signal that is fed to a resonant tank 105 (a tuned L-C circuit) including a transmitter coil. The system includes a heating pan, which can be represented by a receiver coil 401 (corresponding to the receiver coil 301 of FIG. 3), and a load R_Sole receiver 403 (representing the Eddy current losses in the receiver coil/conductive element).

Figure 5:
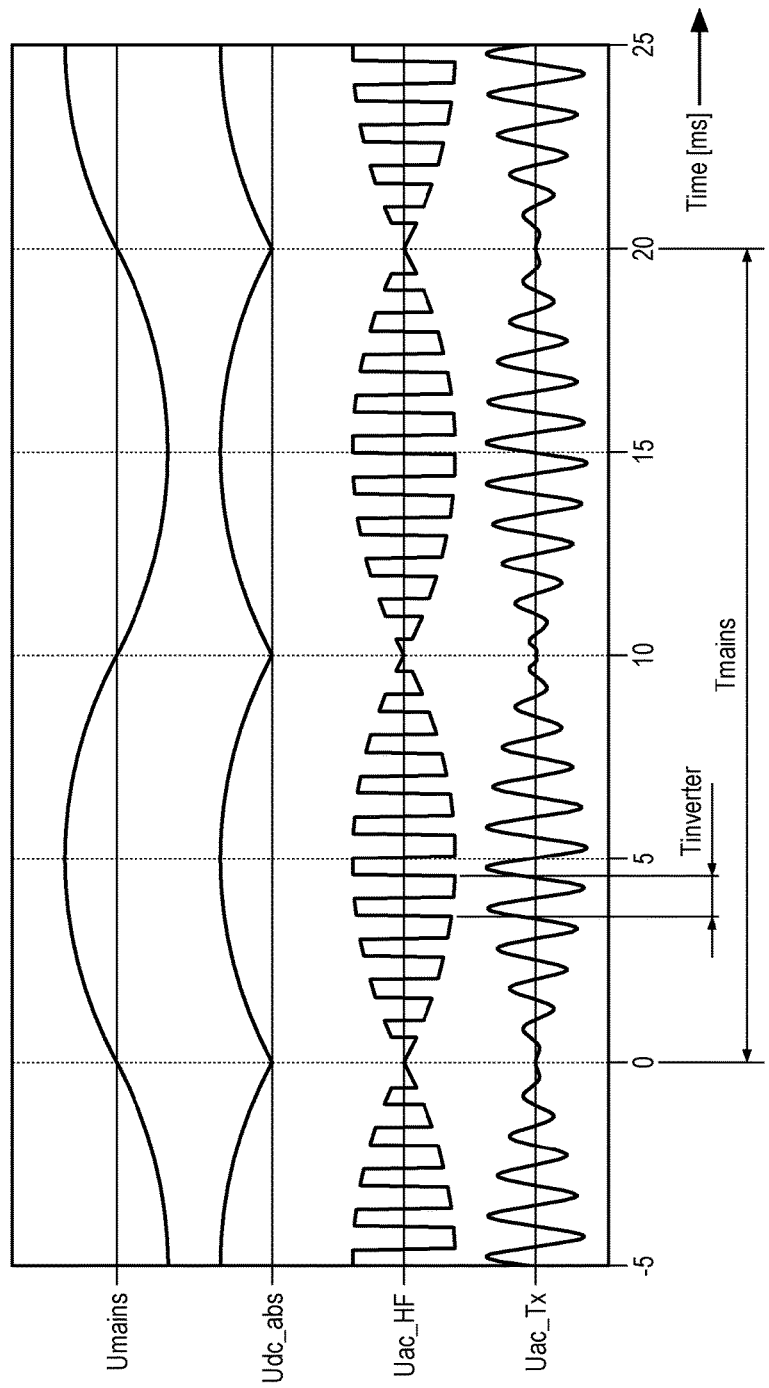
FIG. 5 is an illustration of some voltage waveforms of a power path of a wireless power transfer system.

FIG. 5 illustrates the voltage waveforms of the power path of FIG. 4. The mains voltage Umains is rectified by the AC/DC converter 103 to the voltage Udc_abs. A large storage capacitor, which is used to buffer the rectified mains voltage, is normally not applied in these kinds of applications since it will add to the total mains harmonic distortion of this application. As a result, a varying DC voltage is generated by the AC/DC converter 103.

Because of the characteristics of the rectified voltage Udc_abs, the output voltage Uac_HF of the inverter 107 is shaped as shown in FIG. 5. The normal operating frequency of the inverter is in the order of 20 kHz to 100 kHz.

The transmitter coil, together with the receiver coil 401 and resistance R_Sole receiver 403 is essentially the load of the inverter 107. However, due to the nature of this load (both inductive and resistive) a resonant circuit is typically used in between the inverter 107 and this load in order to cancel the inductive part of the load. Furthermore, the resonant network typically results in a reduction in the switching losses of the inverter 107.

In the exemplary scenario, the power transmitter 101 is used in a kitchen environment to provide wireless power to various kitchen appliances including blenders, food processors, kettles, pots, pans etc. In the example, the power transmitter 101 may be part of a group of power transmitters that may simultaneously provide power to a plurality of appliances. Some of the power transmitters may be provided in a cooking zone that is made from heat resistant materials (such as a ceramic material). Others of the power transmitters may be provided in a preparation zone that is made from a material that is not heat resistant (such as e.g. a kitchen worktop made from wood). Thus, the user may be in a situation wherein he may have a number of power positions available of which some may be suitable for appliances that may get hot whereas other power positions may be unsuitable for these positions. However, it may at times be useful for the user if these positions could also be used for providing power to heating appliances that may become hot.

Specifically, the power transmitter 101 may be positioned immediately below (or be part of) a non-heat resistant worktop thereby rendering it unsuitable for heating appliances such as kettles, pots and pans. However, it may be desirable to use this power transmitter to power such heating appliances, and specifically heating appliances which may provide heat by the induction of Eddy currents in a conductive heat element. However, in order to maximize the power efficiency such heating elements may often be positioned at the part of the appliance which is in closest contact with the power transmitter. Specifically, for a power transmitter in a worktop surface, the appliance may be designed with the heating element at the bottom. In use, the heating element will accordingly also come into contact with the worktop surface (as illustrated in FIG. 2). This may cause damage to the worktop which typically will not be made heat resistant.

Figure 6:
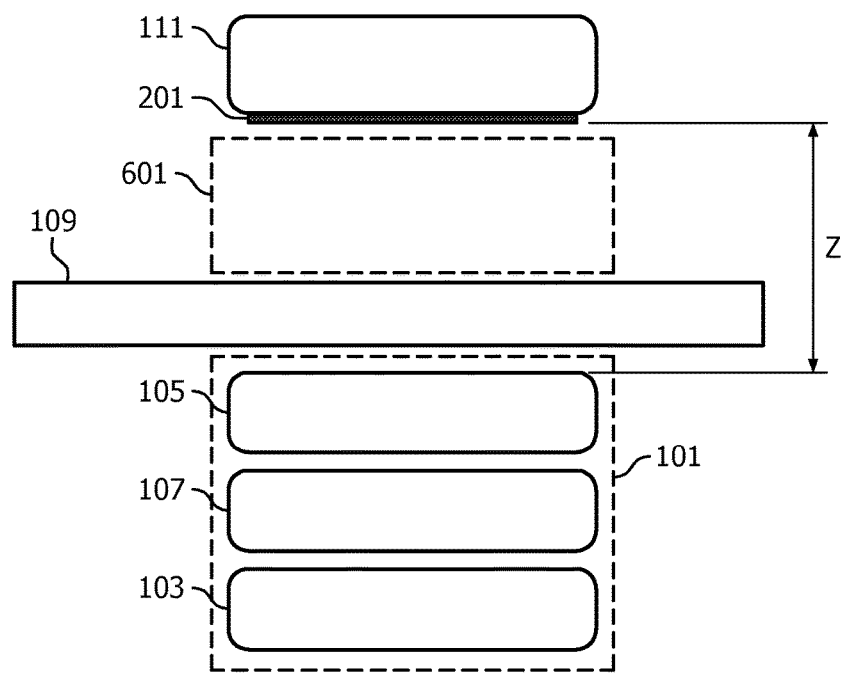
FIG. 6 is an illustration of a wireless power transfer system.

In order to address this issue, a thermal barrier 601 is introduced between the worktop and the appliance as illustrated in FIG. 6. The thermal barrier 601 may be made from a suitable heat resistant material, such as from a suitable ceramic material. The thermal barrier 601 may for example be implemented as a coaster that the user can put on the worktop, and the appliance (e.g. pot or pan) can then be positioned on the coaster by the user. The thermal barrier 601 may also be implemented as an integral part of the appliance.

However, although this may allow the non-protected power position (the power transmitter 101) to be used for powering heating devices, it will typically also substantially increase the distance Z between the power transmitter and the appliance/power receiver. Thus, the distance between the power transmitter coil and the power receiver coil (including e.g. a conductive heating element) will be substantially increased resulting in a substantially reduced coupling between these.

This will result in a requirement for higher currents in the power transmitter coil in order to realize the same amount of magnetic flux field to be captured by the power receiver. The higher currents cause more losses in the inverter and transmitter coil. Also, the higher currents and the increased distance between power transmitter and power receiver will result in more leakage flux. This leads to problems with Electromagnetic Interference (EMI) and Electromagnetic Force (EMF). For example, the International Electro technical Commission (IEC) sets international standards for radiated and conducted electromagnetic interference which must be taken into account for a wireless power transfer system, and these requirements may be increasingly difficult to meet when the distance between power receiver and power transmitter is increased.

In order to address such issues, a thermal barrier is provided which further comprises a power repeater comprising a resonance circuit including an inductor and a capacitor. The resonance circuit may often be formed by a single capacitor and a single capacitor. However, it will be appreciated that in some embodiments the resonance circuit may include a plurality of inductors and/or capacitors. Typically, such circuits are equivalent to a resonance circuit comprising a single capacitor and inductor. It will also be appreciated that the resonance circuit may include other components, such as e.g. resistors or sometimes switch elements.

Figure 7:
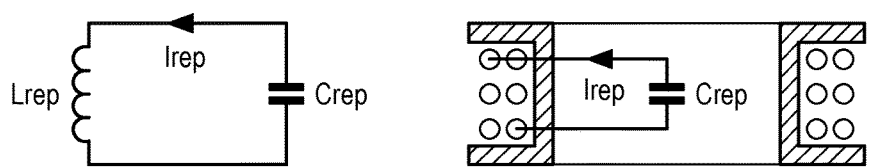
FIG. 7 is an illustration of an example of a power repeater for a wireless power transfer system in accordance with some embodiments of the invention.
Figure 8:
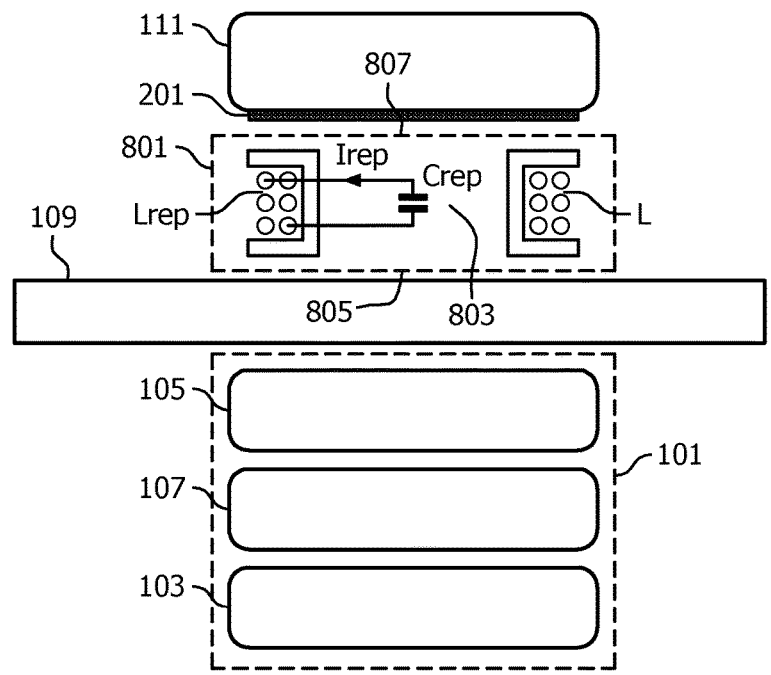
FIG. 8 is an illustration of an example of a power repeater for a wireless power transfer system in accordance with some embodiments of the invention.

Typically, the circuit may form a simple (equivalent) parallel resonant circuit such as is illustrated in FIG. 7 (shown both schematically and with a cross-sectional view of the inductor). An example, of a power transfer system using a thermal barrier 801 in accordance with some embodiments of the invention is shown in FIG. 8. The approach corresponds to that of FIG. 6 but with the use of a thermal barrier 801 comprising a power repeater 803 comprising a resonance circuit, in this case formed by the inductor Lrep (shown in cross section) and the capacitor Crep.

The thermal barrier 801 thus has a second surface area 805 which is in contact with the worktop 109 close to the power transmitter 101. Thus, the thermal barrier 801, and specifically the power repeater/resonance circuit 803 couples to the power transmitter 101 through the second surface area 805. The power transmitter 101 accordingly generates a second electromagnetic signal/field to which the power repeater 803 couples predominantly vie the second surface area 805.

Furthermore, the thermal barrier 801 comprises a first surface area 807 which is intended to be in contact with the power receiver/appliance 111 when in use. Specifically, the heating element 201 of a heating device may be positioned on the first surface area 807.

The wireless power is provided to the power receiver 111 through a first magnetic signal/field which is predominantly provided through the first surface area 807. Thus, the coupling of the power receiver 111 to the thermal barrier 801/power repeater 803 is predominantly via the first surface area 807.

In the specific example, the majority of the magnetic flux reaching the power repeater, and specifically the inductor Lrep, does so via the second surface area 805. This flux may be considered to correspond to the first magnetic signal. Similarly, the majority of the magnetic flux reaching the power receiver 111 from the power repeater, and specifically from the inductor L, does so via the first surface area 807. This flux may be considered to correspond to the first magnetic signal.

The depth of the thermal barrier is typically substantial, and indeed in many embodiments, the distance between the first surface area 807 and the second surface area 805 is at least 1 cm, 2 cm, 3 cm or even 5 cm. Such significant depths may provide a very efficient thermal insulation and protection. Indeed, it may typically allow very hot heating elements to be thermally isolated from thermally sensitive work surfaces. However, an associated disadvantage is that the direct coupling between the power transmitter and the power receiver may be substantially reduced leading to increased power losses etc. In the described approach, these disadvantages are mitigated by the thermal barrier comprising the power repeater 803.

Specifically, the power repeater 803 is arranged to concentrate the energy of the second electromagnetic signal towards the first surface area. Specifically, the power repeater 803 may effectively act as a magnetic lens which concentrates the flux from the second electromagnetic signal to provide the first electromagnetic signal. The power repeater 803 achieves the concentration of the magnetic field by the resonance circuit oscillating with a current induced from the second electromagnetic signal. Effectively, the resonance circuit couples to the power transmitter and to the power receiver thereby resulting in the magnetic flux from the power transmitter being concentrated when provided to the power receiver. The approach may allow the overall coupling between the power transmitter coil and the power receiver coil/receive element to be determined by the distances between the power transmitter coil and the power repeater and between the power repeater and the power receiver coil/element rather than by the total distance between the power transmitter coil and the power receiver coil/element.

The resonance circuit may effectively bridge the distance between transmitter coil and the power receiver coil (heating element) by resonating at or near the frequency of the power signal generated by the power transmitter. The resonance frequency frepeater of the resonance circuit can be determined by inductor Lrep and a capacitor Crep, using the following formula:

$$frepeater = \frac{1}{2 * \pi * \sqrt{Lrep * Crep}}$$

The inductance value Lrep of the resonance circuit may be measured in air without the power receiver or power transmitter nearby. Typical values for Lrep and Crep may 200 uH and 200 nF respectively, which results in a resonance frequency frepeater of 25 KHz. However, it will be appreciated that the specific values will depend on the individual embodiments and the specific resonance frequency.

When the resonance frequency of the resonance circuit is tuned properly to the frequency of the power signal, a resonating current Irep is induced in the resonance circuit. Under this condition, the magnetic field lines inside the loop area are exactly in phase with the magnetic field lines generated by the power transmitter. As a consequence, the magnetic field lines from the power transmitter are guided towards the power receiver.

Figure 9:
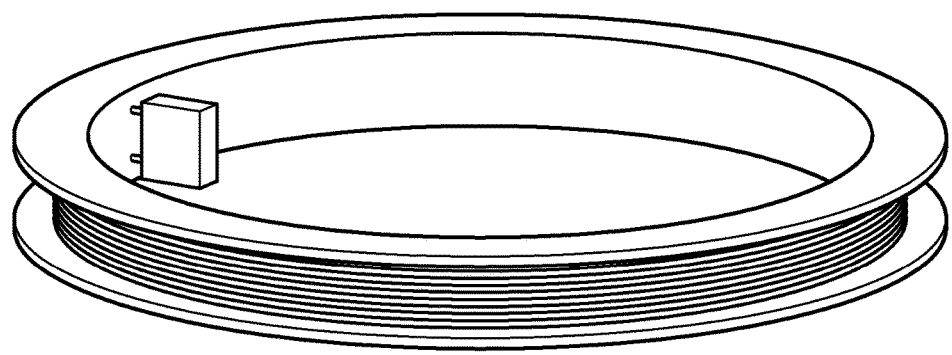
FIG. 9 is an illustration of an example of a power repeater for a wireless power transfer system in accordance with some embodiments of the invention.

FIG. 9 shows an image of a three-dimensional view of an implementation of the power receiver/resonance circuit 803. Typical diameters for the inductor may be in the 10 cm-25 cm range.

Thus, the system provides a means for using a thermal barrier to provide thermal insulation and protection between a power transmitter and power receiver while reducing and mitigating the impact on the power transfer. Specifically, the increased distance between the power transmitter and the power receiver needed to create the thermal barrier is bridged by a power repeater within the volume of the thermal barrier.

In the example, the first surface area 807 and the second surface area 805 are on opposite surfaces of the thermal barrier 801, i.e. they are opposite each other. However, it will be appreciated that whereas this may be a practical implementation in many scenarios, the geometric interrelation between the surfaces may be different in other embodiments.

Similarly, the second surface area 805 are in the example arranged to allow the thermal barrier 801 to contact and specifically rest on the power transmitter/worktop. Similarly, the first surface area 807 is arranged to receive a power receiver which specifically is a heating appliance. The first surface area 807 may specifically be arranged for the power receiver to rest on when being powered. Furthermore, in the example, the first surface area 807 and the second surface area 805 are both substantially horizontal when in use. However, it will be appreciated that in other embodiments, the surfaces may have other characteristics and couple to the power transmitter and power receiver in other ways.

In the described example, the thermal barrier is detachable from the power transmitter and the power receiver, and specifically the thermal barrier is a separate entity from the power transmitter and the power receiver. This may allow the thermal barrier to be used flexibly and for many different applications. For example, it may allow the thermal barrier to be implemented as a coaster which can be placed on power provision positions of a kitchen preparation zone when these are used with heating appliances.

However, in some embodiments, the thermal barrier may be part of the power receiver itself. Thus, a given heating appliance may include both a heating element and a thermal barrier comprising a power repeater. For example, a kettle may have a thermal barrier positioned at the bottom with the heating element being located on top of the thermal barrier. This may allow the kettle to be positioned on a non-heat resistant surface without damaging it while allowing e.g. water to be boiled simultaneously.

Figure 10:
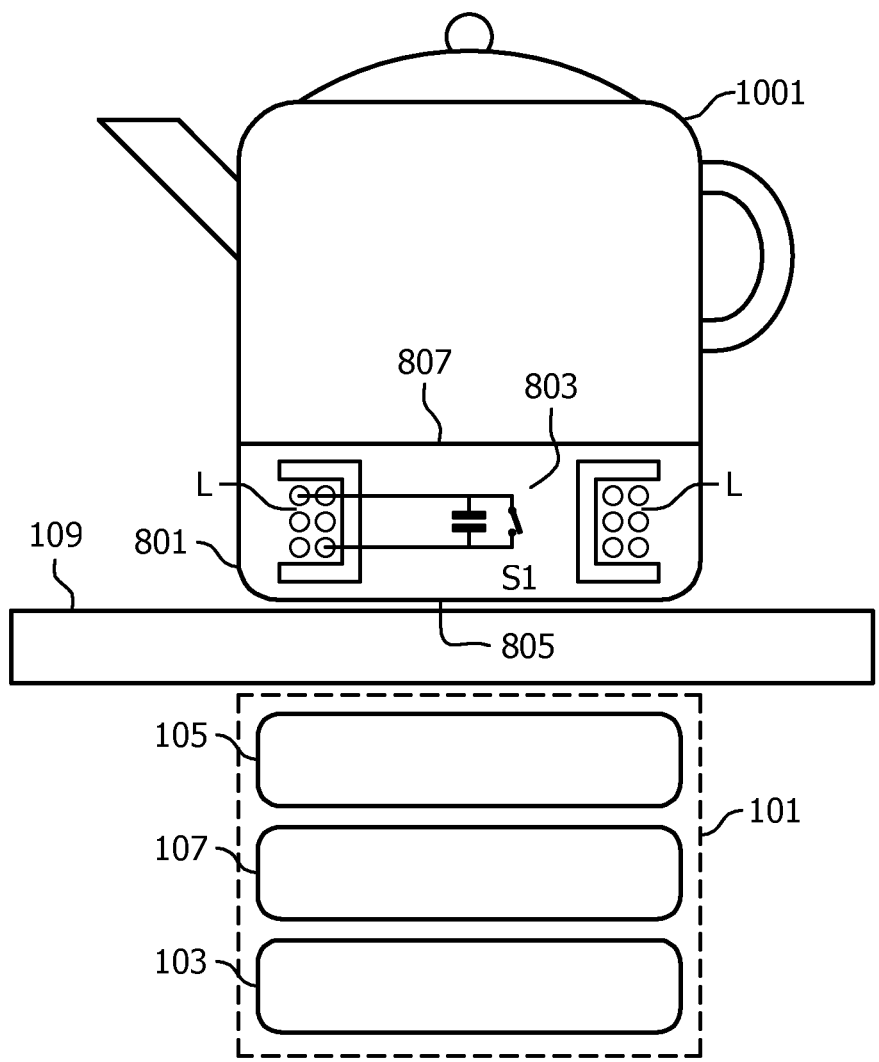
FIG. 10 is an illustration of an example of a power repeater for a wireless power transfer system in accordance with some embodiments of the invention.

An example of a wireless power transfer system using such an appliance is illustrated in FIG. 10.

In the example, the power transmitter 101 is located in the preparation zone of a kitchen worktop. The power transmitter 101 generates an alternating magnetic flux field. A kettle 1001 is positioned on the preparation zone over the power transmitter 101. Part of the magnetic flux reaches the heating element which in the example is in contact with the first surface area 807. This causes Eddy currents in the heating element resulting in it becoming hot allowing the water to be heated. Due to the presence of the thermal barrier 801, the worktop 109 is protected from possible damage due to the heat generated in the heating element.

However, due to the presence of the thermal barrier 801, the distance between the transmitter coil 105 and the heating element is increased. To address this, the power repeater 803 is included in the thermal barrier 801 that is an integral part of the water kettle 901. The power repeater 803 then effectively bridges the gap between the transmit coil 105 and the heating element.

In some embodiments, the thermal barrier may furthermore be arranged to control the energy level of the second electromagnetic signal. Specifically, it may control the electromagnetic flux/electromagnetic field strength at the power receiver based on temperature measurement information.

Figure 11:
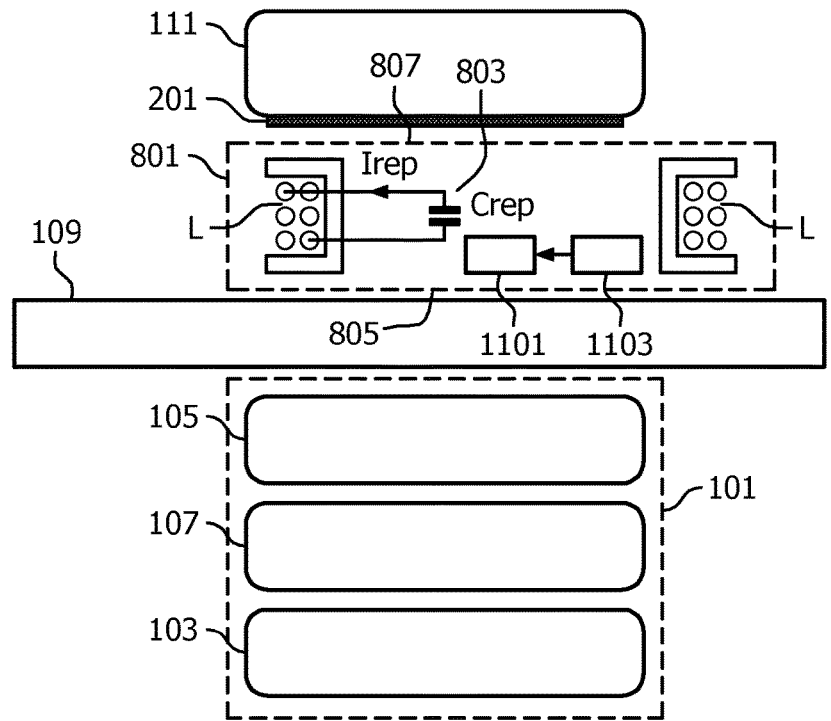
FIG. 11 is an illustration of an example of a power repeater for a wireless power transfer system in accordance with some embodiments of the invention.

Specifically, as illustrated in FIG. 11, the thermal barrier 801 may comprise a controller 1101 for controlling an amplitude/energy level of the first electromagnetic signal in response to temperature measurements. The controller 1101 is arranged to modify the energy level by adapting a property of the resonance circuit. The property may in most embodiments be a resonance frequency of the resonance circuit but may in other embodiments e.g. also be e.g. a dampening or loss of the resonance circuit (i.e. the Q of the circuit). The controller 1101 may specifically be arranged to modify the effective inductance, capacitance or resistance of the resonance circuit.

Specifically, the concentration and retransmission of energy by the power repeater 803 is strongest when the resonance frequency is the same as that of the second electromagnetic signal and when there is no loss in the resonance circuit. However, deviating from these values will result in the magnetic flux and magnetic field strength reducing at the power receiver. Accordingly, by modifying the resonance frequency (or loss/dampening), the power that can/will be extracted is reduced. For example, the amount of Eddy currents and thus the heating of a heating element may be controlled by the controller 1101.

Thus, in some embodiments, the controller 1101 may modify the transferred power towards the power receiver by controlling the behavior of the power repeater 803, e.g. by changing an inductance, a capacitance or a resistance value in the power repeater 803.

The behavior of the power repeater 803 in terms of its ability to guide the flux lines towards the power receiver 111 may be affected by the controller 1101 e.g. by changing the inductance Lrep, the capacitance Crep, or the resistance value for the resonance circuit. Changing one or more of these parameters will change the tuning (or Q) of the resonance circuit, and with that its ability to guide the flux lines. Accordingly, this provides a(n additional) way of controlling the power transfer to the power receiver, and e.g. specifically of controlling the heating of the heating element. This control may be performed in addition to other control mechanisms or may be the only control. For example, it may be an additional means of control in addition to the conventional modification of an amplitude or frequency of the power signal generated by the power transmitter.

The controller 1101 is coupled to a temperature measurement receiver 1103 which is arranged to receive temperature measurements. The temperature measurements may in many embodiments be indicative of a temperature of a part of the power receiver 111, and may often be indicative of the temperature of the heating element 201. In some embodiments, the temperature measurement receiver 1103 may be arranged to receive the temperature measurement from an external source, such as specifically from the power receiver 111. In other embodiments, the temperature measurement receiver 1103 may be arranged to receive the temperature measurement from an internal source, such as specifically from a temperature sensor being part of the thermal barrier 801.

The temperature measurement receiver 1103 is arranged to forward the received temperature measurement(s) to the controller 1101, and the controller 1101 is arranged to control the level of the first electromagnetic signal based on the received temperature measurement. Specifically, the controller (1101) is arranged to reduce the level of the first electromagnetic signal for increasing values of the temperature measurement.

In some embodiments, the control may be a gradual control such that the level of the first electromagnetic signal is gradually reduced when the temperature increases. This may bias the first electromagnetic signal towards reducing the power that is provided to the power receiver when the measured temperature increases, and may accordingly provide a temperature stabilisation or control.

In some embodiments, the control may be less gradual, and in particular there may be a non-linear relationship between the temperature and the level of the first electromagnetic signal.

As a specific example, in some embodiments the controller 1101 may be arranged to detect that the temperature measurement indicates a temperature above a given threshold. This may correspond to a detection that the temperature exceeds a safe level and that it could potentially cause damage. Accordingly, the controller 1101 may proceed to change the resonance circuit characteristics such that the resonance circuit does not concentrate energy towards the power receiver, and specifically such that it actively reduces and blocks the energy transfer towards the power receiver. This may e.g. be done by shortcircuiting the resonance capacitance $C_{rep}$ resulting in the power repeater 803 not repeating the power transfer towards the power receiver 111 but effectively reducing this. The flux through the first surface area is accordingly reduced compared to what it would be if the temperature had not exceeded the threshold.

In this way, the thermal barrier 801 may accordingly introduce an additional temperature control, and may in particular introduce an additional safety feature wherein overheating can be detected and this detecting can result in the reduction of power to the power receiver 111, and thus in reduced temperature.

It will be appreciated that in some embodiments, the level reduction may directly follow the temperature, and e.g. that the level may be increased again when the temperature measurement indicates that the temperature has fallen below the threshold (or another threshold e.g. introducing hysteresis). In other embodiments, the reduction may for example have a latching effect. For example, if an overheating situation is detected (specifically, if it is detected that the temperature measurement exceeds a value), the controller 1101 may proceed to reduce the level and specifically to block the power concentration towards the power receiver 111 as much as possible. The thermal barrier 801 may remain in this mode even if the temperature measurement drops below the threshold value, and may e.g. remain in the blocking mode until a user input is received. For example, if an overheating is detected by the thermal barrier 801, the controller 1101 may change the properties of the resonance circuit to block the power transfer, switch on a warning light, and wait for a button to be pressed. Only when the user presses the button will the thermal barrier 801 resume normal operation.

The thermal barrier 801 may accordingly provide additional functionality and especially may provide an additional safety protection in many embodiments. Furthermore, this operation may be independent of the direct power transfer control between the power receiver and power transmitter.

For example, the power receiver and the power transmitter may be arranged to perform power transfer in accordance with the Qi power specification without any consideration or indeed knowledge of whether a thermal barrier is present or not. However, by inserting the thermal barrier 801 between the power receiver and the power transmitter, increased protection for the surface material of the power transmitter can be achieved. In addition, during normal power transfer, the power repeater 803 provides increased efficiency while the overheating protection introduces an overheating detection that can block the power transfer. These additional functions can be provided without any changes to the operation of the power receiver and power transmitter and thus the approach has high backwards compatibility.

The overheating may for example occur due to a failure in the communication between the power receiver and the power transmitter. For example, errors in power control data may result in the power of the provided magnetic signal being set too high. The functionality of the thermal barrier allowing this to address the overheating may accordingly provide a more reliable and potentially safer operation. In particular, it may in some embodiments prevent single point failures from resulting in excessive temperatures.

As another example, the thermal barrier 801 may be arranged to block power transfer if the temperature measurement indicates a temperature of the surface of the power receiver which comes into contact with the first surface area 807 above a threshold set to correspond to the temperature that the material of the thermal barrier 801 can withstand. Thus, the thermal barrier 801 can include a self-protection function that ensures that the power receiver will not damage the surface of the thermal barrier 801.

In some embodiments, the controller 1101 may also be arranged to increase the level of the first electromagnetic signal for decreasing values of the temperature measurement. For example, if the temperature measurement indicates a temperature which is below a desired target value, the controller 1101 may be arranged to change the property such that the level of the first electromagnetic signal is increased and the power being transferred increases. Specifically, if the resonance circuit has previously been modified to block power transfer due to a detection of an overheating situation, a detection that the temperature has fallen below a given threshold may result in the controller 1101 changing the resonance circuit back towards normal operation where the power repeating effect is maximised.

The level of the first electromagnetic signal may be considered equivalently as the e.g. the flux magnitude passing through the first surface area 807, the flux density for the first surface area 807 and/or the power or amplitude level of the first electromagnetic signal.

The reduction of the level of the first electromagnetic signal may be by the controller 1101 reducing the magnetic flux density of the first electromagnetic signal for the first surface area relative to a magnetic flux density of the second electromagnetic signal for the second surface area for increasing values of the temperature measurement. The controller 1101 may specifically change the property to reduce the ratio between a second level of the second electromagnetic signal and the first level of the first electromagnetic signal for increasing values of the temperature measurement.

Thus, by changing the property of the resonance circuit, the flux density, and accordingly the total flux and power, of the electromagnetic field through the first surface area 807 can be reduced for a constant electromagnetic field being generated by the power transmitter 101. Thus, the amount of concentration of the second electromagnetic signal/field into the first electromagnetic signal/field is dependent on the characteristics of the resonance circuit. Changing the property of the resonance circuit can accordingly achieve that even if no change occurs for the electromagnetic signal generated by the power transmitter 101 (e.g. the power transmitter still outputs the same power), the level of the electromagnetic signal/field which passes through the first surface area 807 to reach the power receiver 111 (specifically the heating plate 201) can be reduced.

Specifically, the controller 1101 can reduce the flux through the inductor L, and thus through the first surface area 807, by changing the resonance frequency away from the resonance frequencies of the resonance circuit of the power receiver, the resonance circuit of the power transmitter, and/or from the frequency of the second electromagnetic signal. Typically, the closer the resonance frequencies are to each other, the stronger the first electromagnetic signal will be, i.e. the power of the first electromagnetic signal through the first surface area 807 will increase the closer the resonance frequencies are too each other. Also, the closer the resonance frequency is to the frequency of the second electromagnetic signal, the stronger the first electromagnetic signal will tend to be.

Figure 12:
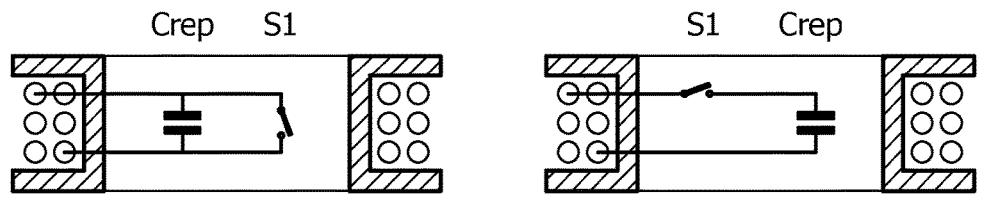
FIG. 12 is an illustration of an example of a power repeater for a wireless power transfer system in accordance with some embodiments of the invention.

In some embodiments, the capacitor Crep may effectively be implemented as a variable capacitor controlled by the controller 1101. Accordingly, the controller 1101 can change the value of the capacitor, and thus the resonance frequency of the resonance circuit to reduce the level of the first electromagnetic signal. As a specific example, the controller 1101 may disconnect or short circuit the capacitor, thereby effectively stopping resonance of the resonance circuit at frequencies close to the resonance frequencies of the power receiver and power transmitter resonance circuits. This will effectively stop the power transfer/repeater effect of the thermal barrier 801 with respect to the power receiver. Thus, by disconnecting or short-circuiting the capacitor in response to a detection of the temperature measurement exceeding a threshold, the thermal barrier 801 may block most of the power repetition/transfer. Effectively, the thermal barrier 801 may switch-off the power supply to the power receiver by appearing as an electromagnetic barrier to the power transfer, e.g. by by short-circuiting the repeater coil. Thus, a particularly attractive way of modifying the resonance frequency of the resonance circuit may in many embodiments be to short circuit or disconnect the capacitor by a switch, as illustrated in FIG. 12.

By short circuiting the capacitor, the function of the resonance circuit inside the thermal barrier changes from guiding the magnetic field towards the power receiver/first surface area to blocking the magnetic field towards the power receiver/first surface area. This results in change of the field to which the power receiver is exposed and consequently a change of heat generation in the heating element.

This may allow a very efficient and quick reduction of the amount of power that is provided to the power receiver, and may e.g. be used to very quickly reduce the power in case an error situation is detected, e.g. by the thermal barrier itself.

By disconnecting the capacitor, the function of the resonance circuit inside the thermal barrier changes from guiding the magnetic field towards the pan-power receiver to reducing the magnetic field intensity near the power receiver. This results in a scenario which corresponds to the scenario where there is no power repeater present. If the current through the power transmitter coil is unchanged, the field to which the power receiver is exposed will reduce and consequently the heat generation in the heating element will be reduced. The approach may e.g. be used as an additional control means to quickly reduce the heat generation in the appliance e.g. if the target temperature is achieved, e.g. if the water is boiling.

The controller 1101 may in some embodiments be controlled by the power receiver. The power receiver may provide control data to the controller 1101 which can proceed to adapt the behavior of the resonance circuit in response to this control data.

For example, the power receiver may comprise a temperature sensor which can measure the temperature of a part of the powered appliance, such as specifically the temperature of the heating element 201. The power receiver may communicate this to the power transmitter via a suitable communication channel (as e.g. specified for Qi power transfer systems). However, the response time for such an operation is typically relatively high and introduces a substantial delay before the system reacts to the overheating.

In such embodiments, the power receiver may upon detection of the overheating provide a control signal to the thermal barrier that requests the barrier to reduce the power provided to the power receiver as much as possible. This request may be fed to the controller which in response may proceed to close the switch S1 in order to short circuit the capacitor.

This will result in a very quick response time and a very substantial reduction in power available to the power receiver. Accordingly, the heating will be reduced and the overheating scenario is mitigated. Thus, this can be achieved without involving the power transmitter.

The overheating may for example occur due to a failure in the communication between the power receiver and the power transmitter. For example, errors in power control data may result in the power of the provided magnetic signal being set too high. The functionality of the thermal barrier allowing this to address the overheating may accordingly provide a more reliable and potentially safer operation. In particular, it may in some embodiments prevent single point failures from resulting in excessive temperatures.

In case the thermal barrier 801 is an integral part of the appliance, like in FIG. 10, the appliance can provide control data to the controller 1101 by a wired connection to realize a fast control mechanism.

In other embodiments, for which the thermal barrier 801 is not part of the appliance, the thermal barrier may comprise a data receiver coupled to the controller 1101 where the receiver is arranged to receive control data from the power receiver and the power receiver may comprise a data transmitter which can communicate data to the thermal barrier. This may for example be achieved using Bluetooth or NFC communication units in the power receiver and the thermal barrier.

In some embodiments, the controller 1101 may alternatively or additionally be controlled by a user input received from a user interface of the thermal barrier 801 itself. Specifically, the thermal barrier 801 may comprise a user interface allowing e.g. a user to set a maximum power level. The power level may e.g. be set by the user pressing a button when an appliance is considered to operate at the highest reasonable power level. The current in the resonance circuit may be measured and stored. In future operations, the resonance circuit current may be continually measured and compared to the stored value. If it exceeds the stored value, the controller 1101 may proceed to change the resonance frequency or introduce dampening (resistance, loss) to the resonance circuit in order to reduce the efficiency of the power repeater.

In many embodiments, the receiver 1103 may be arranged to receive a temperature measurement from the power receiver 111. Thus, the receiver 1103 may receive control data in the form of temperature measurements from the power receiver 111. The temperature measurement may for example be generated by a temperature sensor measuring the temperature of the heating element 201 and may be communicated to the receiver 1103 using any suitable communication approach including e.g. load modulation of the first electromagnetic signal or using a separate communication link, such as an NFC or Bluetooth™ communication link.

Temperature measurements may be transmitted at a suitable update rate depending on the specific preferences and requirements of the individual embodiment. For example, in many embodiments, new temperature measurements may be generated e.g. every 1-5 seconds.

In some embodiments, the thermal barrier 801 may itself comprise an overheating protection. For example, the thermal barrier 801 may comprise a temperature sensor coupled to the receiver 1103. The temperature sensor may for example be positioned very close to, or in contact with, the first surface area 807. Thus, the temperature sensor may effectively measure the temperature of the first surface area 807, and thus indirectly the temperature of e.g. the heating element 201 of the power receiver.

The temperature measurements (whether received from an internal or external source) may be fed from the receiver 1103 to the controller 1101 which may continually compare the measured temperature with e.g. a temperature which is considered acceptable for the power receiver 111 or for the thermal barrier 801. If this is exceeded the controller 1101 may proceed to react by changing the behavior of the resonance circuit, e.g. by short circuiting the capacitor.

In some embodiments, the temperature sensor may be positioned at, or near, the second surface area 805, and thus may measure the temperature of the contact surface for the worktop. This temperature may by the controller 1101 be compared to a reference temperature which is considered the maximum acceptable without damaging the worktop. If this temperature is exceeded, the controller 1101 may proceed to react by changing the behavior of the resonance circuit, e.g. by short circuiting the capacitor.

As previously described, if the temperature sensor generates a temperature measurement which e.g. exceeds a preset threshold, the controller 1101 may proceed to change the characteristics of the resonance circuit such that the level of the first electromagnetic signal is reduced, i.e. the power provided to the heating element 201 is automatically reduced. In many embodiments, the power transfer to the power receiver 111 may effectively be blocked if the temperature sensor in the thermal barrier 801 measures a temperature that exceeds the threshold, thereby providing a separate and independent overheating protection which specifically may protect the surface of the power transmitter or the surface of the thermal barrier 801 from damage due to excessive heating by the power receiver 111.

In many embodiments, the thermal barrier may comprise a user interface allowing e.g. a user to set the reference or threshold temperatures for the first surface area 807 and/or the second surface area 805.

In such examples, the thermal barrier 801 may e.g. detect if a failure occurs in the communication between the power receiver and the power transmitter resulting in overheating.

For example, if an error occurs in the communication between the power transmitter and the power receiver for a scenario wherein a water kettle is powered, there may be a substantial delay before this is detected and addressed by the power transmitter. This could e.g. lead to the water kettle overheating or boiling dry. However, the control functionality of the thermal barrier 801 may detect this and proceed to de-tune the resonance frequency of the resonance circuit.

It will be appreciated that the exact approach and control of the level of the first electromagnetic signal in dependence on the temperature measurements may depend on the preferences and requirements of the individual embodiment, and in particular on the desired operational characteristics.

As previously described, the controller 1101 may be arranged to compare the temperature measurement to a temperature threshold and to reduce the level of the first electromagnetic signal if the temperature measurement exceeds the temperature threshold. The resonance circuit may specifically be operated with given characteristics, and specifically with a given resonance frequency, as long as the temperature measurement is below the threshold. In this mode of operation, the resonance circuit may provide a given concentration of the power of the second electromagnetic signal into the first electromagnetic signal, and may typically seek to maximise the ratio between the power of the first electromagnetic signal and the second electromagnetic signal. The control of the power of the first electromagnetic signal may be achieved using conventional operation, such as e.g. using operation similar to the Qi specification, and specifically by the power receiver 111 directly communicating power control messages to the power transmitter 101, thereby implementing a power control loop.

However, if the temperature measurement increases beyond the threshold value, corresponding e.g. to an overheating scenario being detected, the controller 1101 may proceed to change the properties of the resonance circuit such that power of the first electromagnetic signal is reduced, even if the power of the second electromagnetic signal is unchanged or potentially even if it increases (e.g. due to the power receiver 111 erroneously transmitting power up requests to the power transmitter 101). The controller 1101 may specifically seek to block power transfer to the power receiver 111 as much as possible, and may e.g. short circuit or disconnect the capacitor of the resonance circuit.

In many embodiments, the controller 1101 may be arranged to control the level of the first electromagnetic signal by controlling a maximum allowable level for the first electromagnetic signal. The maximum allowable level may be a level of the first electromagnetic signal that the controller 1101 will not allow the level to increase beyond. Thus, if the controller 1101 detects that the level of the first electromagnetic signal increases beyond the maximum allowable level, it proceeds to change the resonance circuit to reduce the level. Thus, the controller 1101 is arranged to modify the resonance circuit to reduce the level of the first electromagnetic signal if this increases above the maximum allowable level. If the level is however below the maximum allowable level, the controller 1101 may in many embodiments keep the resonance circuit unchanged and specifically may set it to provide the maximum power transfer.

In embodiments wherein the controller 1101 is arranged to control the resonance circuit to maintain the level of the first electromagnetic signal below a maximum allowable level, it may further be arranged to set the maximum allowable level as a function of the temperature measurement. Specifically, it may reduce the maximum allowable level in response to an increasing value of the temperature measurement. Thus, as the temperature increases, the controller 1101 may modify the maximum allowable level. Such an approach may for example prevent a temperature runaway and may e.g. gradually reduce the maximum power that can be induced in the heating plate 201 as the temperature increases.

In some embodiments, the controller 1101 may be arranged to compare the temperature measurement to a temperature threshold and to set the maximum allowable level in dependence on whether the temperature measurement exceeds the threshold or not. Specifically, if the temperature measurement exceeds the threshold, the maximum allowable level is set to a lower value than if it does not exceed the threshold.

The maximum allowable level may in many scenarios be substantially lower for temperature measurements above the threshold than below it. Indeed, in many embodiments, the maximum allowable level when the temperature measurement exceeds the temperature threshold may be no more than 5%, 10% or 20% of the maximum allowable level when the temperature measurement does not exceed the temperature threshold (the exact value may depend on the specific application).

Such an approach may for example provide very efficient overheating protection. Specifically, as long as the temperature measurement remains below the threshold for an overheating detection, the maximum allowable level may be set to a high level. The high level may even be set higher than that which can be generated by the power transmitter 101, i.e. there may be no power restriction by the resonance circuit for any power level in this case. In many cases, where there is no restriction of the maximum power when the temperature measurement is below the threshold, the maximum allowable level may be considered to correspond to the maximum power level as indicated by the power receiver, or as the maximum power level that can be provided by the power transmitter 101. This may allow normal operation and in particularly may support high power applications, such as a kettle or pan.

However, if the temperature measurement rises above the threshold, the controller 1101 may proceed to (typically quickly) modify the resonance circuit such that it now effectively blocks power transfer. Thus, if overheating is detected, the controller 1101 blocks the power such that the temperature is reduced and the overheating scenario is addressed.

The level of the first electromagnetic signal may for example be measured as a current, voltage or power of the resonance circuit. Thus, in many embodiments, the maximum allowable level may be represented by a maximum current, voltage or power for the resonance circuit. E.g. in many embodiments, the maximum allowable level may be represented by an inductor current for the resonance circuit, and thus the controller 1101 may be arranged to measure the current through the inductor L and to compare this to the maximum allowable current. If the measured current exceeds the maximum allowable current, the controller 1101 can proceed to change e.g. the resonance frequency of the resonance circuit such that the inductor current is reduced.

The ability of the resonance circuit to guide the flux lines towards the kettle/power receiver can specifically be reduced by short circuiting or disconnecting the capacitor Crep with a switch S1. If an over temperature is detected via the temperature sensor, the control unit closes (or opens) the switch S1 to short (or disconnect) capacitor Crep.

The approach may thus provide an additional redundancy layer in detecting erroneous situations.

In some embodiments, the controller 1101 may be arranged to adapt a resonance frequency of the resonance circuit to match a frequency of the second electromagnetic signal. This operation may for example be performed when the temperature measurement indicates a temperature which is below the threshold level, such as during normal operation. Thus, as long as the temperature does not exceed the threshold, the controller 1101 may proceed to adapt the resonance circuit to provide e.g. optimal power transfer. However, if a temperature measurement exceeding the threshold is detected, the safety operation takes over and the controller 110 may modify the resonance circuit to e.g. block power transfer to the power receiver.

For example, during normal operation, the controller 1101 may be arranged to modify the capacitance of the capacitor such that the resonance frequency is varied. The controller 1101 may continuously monitor the current through the inductor/capacitor (e.g. the average absolute, amplitude or peak value) and adjust the capacitance to maximize the current. This may allow an automatic adaptation of the power repeater 803 to the operating frequency to optimize the power transfer from the power transmitter to the power receiver.

Typically, the resonance frequency frepeater of the resonance circuit is influenced by e.g. component variations, the coupling factors between power transmitter, resonance circuit and power receiver, the presence of e.g. ferrite in the power transmitter, the existence of a resonance circuit within the power transmitter etc. Therefore, the desired effect of the resonance circuit resonating at the frequency of the power signal is in many embodiments improved by the thermal barrier being arranged to adapt the resonance frequency dynamically to compensate for such effects.

A particularly attractive approach for adapting or modifying the resonance frequency of the resonance circuit is in many embodiments to temporarily short-cut the capacitor for part of each cycle for at least some cycles of the second electromagnetic signal. Specifically, this may provide an effective gradual change of capacitance.

Specifically, the approach may effectively provide a variable capacitance which can be used to provide relatively fine adjustment of the resonance frequency.

As a specific example, the controller 1101 may measure the alternating voltage across the capacitor while the switch S1 (in parallel with the capacitor) is open. By closing switch S1 during a fraction of the signal period after the voltage across S1 reaches zero (so called Zero Voltage Switching), the capacitance of the circuit can be virtually increased. As a consequence, the resonance frequency of the resonance circuit can be gradually decreased.

As an example, FIG. 13 shows the voltage across Crep, the current through Lrep, the current through Crep and the current through S1 which is in parallel to Crep for three different operational modes. In the example, the value of Crep is chosen at 60% of the value at which the repeater circuit would have its self-resonance.

In the first mode (top-picture) switch S1 is open. No current therefore flows through S1.

In the second mode (middle picture) switch S1 is closed for 1.7 us after the voltage across Crep reaches zero. During that time, S1 temporarily inhibits the charging of Crep while it maintains the flow of current through Lrep. As a consequence, the resonance frequency of the repeater circuit moves closer to the frequency of the power signal. This results in a larger current through the repeater circuit.

In the third mode switch S1 is closed for 3.25 us after the voltage across Crep reaches zero. The result is that the repeater circuit resonates at the frequency of the power signal, resulting in a very large current through the repeater circuit.

In some embodiments, the thermal barrier 801 may furthermore be arranged to transmit data to the power transmitter by modifying a property of the resonance circuit.

Indeed, modifying the capacitance, inductance, or resistance of the resonance circuit results in change in the magnetic field which is reflected back to the power transmitter coil. The power transmitter can detect this change e.g. as an impedance change at the transmitter coil.

Thus, in some embodiments, the thermal barrier 801 may comprise a communication unit which may change a property of the resonance circuit in response to data that it wishes to communicate. For example, a bit may be communicated by the communication unit temporarily changing the resonance frequency slightly with the degree of change depending on whether the bit is a "0" or "1". The power transmitter may detect the change as a change in impedance of the transmit coil with the degree of change accordingly depending on whether the bit is a "0" or "1". The modulation and demodulation of such data may also follow a similar technique as is defined for the communication link between the power receiver and power transmitter.

The system may thus provide e.g. additional communication in the wireless power transfer system such that communication is not only between the power receiver and the power transmitter but may also be between the thermal barrier and the power transmitter. This may in particular allow additional functionality, and indeed may allow the thermal barrier to also control the provided transmit power.

For example, if the thermal barrier comprises a temperature sensor measuring the temperature of the second surface area contacting the kitchen worktop, the thermal barrier may not only change the resonance circuit to block power transfer but may also transmit a control signal to the power transmitter if this temperature exceeds a given limit. In response, the power transmitter may proceed to reduce the transmit power in order to reduce the risk of overheating. Thus, the thermal barrier may provide additional redundancy in controlling the power provision and specifically in preventing overheating that may cause damage to the worktop. Specifically, the added communication may be used to allow the thermal barrier to control the transmit power from the power transmitter such that overheating of the thermal barrier itself does not occur.

In some embodiments, the thermal barrier may comprise a user interface for a user to provide a user input, and the thermal barrier may generate data for the power transmitter in response to this user input. In some embodiments, the user input data may be directly communicated to the power transmitter thereby allowing the thermal barrier to effectively add an (additional) user interface to the power transmitter. In other embodiments, the thermal barrier may not directly transmit the user data to the power transmitter but may instead use the user input internally and provide control data to the power transmitter which is dependent on the user input. For example, the user interface may be used to allow a user to input the threshold temperature for detection of an overheating condition. The measured temperature may then be compared to this user input threshold temperature, and the power transfer may be blocked (and possibly control data may be transmitted to the power transmitter) if the threshold temperature is exceeded.

In some case embodiments the appliance may not have a communication link to the power transmitter. In that case the thermal barrier may control the power transfer to the appliance during normal operation. E.g. the user may set a desired temperature for primary interface for heating the appliance. With a temperature sensor, the thermal barrier can measure the actual temperature of the primary interface as a result of the temperature of the appliance. The thermal barrier can compare the actual measured temperature to the temperature set by the user to determine a control error. The thermal barrier can communicate the control error to the power transmitter for adapting the power signal accordingly and in addition can control its resonance circuit for guiding the power signal to the appliance by tuning/detuning e.g. circuit to the operation frequency. Thus, in this scenario, the thermal barrier may e.g. control the level of the first electromagnetic signal such that the desired temperature is achieved.

Especially, if the temperature measurement indicates a temperature that is higher than the target temperature, the level of the first electromagnetic signal may be reduced, e.g. by adjusting the resonance circuit to have a resonance frequency which is further from the resonance frequency of the resonance circuits of the power transmitter and/or power receiver, and/or to the frequency of the second electromagnetic signal generated by the power transmitter.

If the temperature measurement indicates a temperature that is lower than the target temperature, the level of the first electromagnetic signal may be increased, e.g. by adjusting the resonance circuit to have a resonance frequency which is closer to the resonance frequency of the resonance circuits of the power transmitter and/or power receiver, and/or to the frequency of the second electromagnetic signal generated by the power transmitter. Thus, in such a scenario, the controller 1101 may also be arranged to increase the level of the first electromagnetic signal for lower values of the temperature measurement.

Indeed, in the example, the controller 1101 may be arranged to increase the level of the first electromagnetic signal if the temperature measurement is below a lower threshold value, and to reduce the level of the first electromagnetic signal if the temperature measurement is above a higher threshold value. The higher threshold value will be higher or equal to the lower threshold value. The amount of increase or decrease (and/or the rate of change) of the level of the first electromagnetic signal may depend on the magnitude of the difference between the temperature measurement and the appropriate threshold.

In this way, the thermal barrier may introduce a temperature control loop that does not require adaptation of the power transmitter or indeed in many scenarios of the power receiver. The approach may be combined with the overheating protection (e.g. blocking power transfer if a threshold is exceeded) or may be implemented independently of this.

The approach may utilize a power transmitter which is arranged to detect whether a thermal barrier is indeed present, and which may be arranged to only provide high power if a thermal barrier is indeed present.

Figure 14:
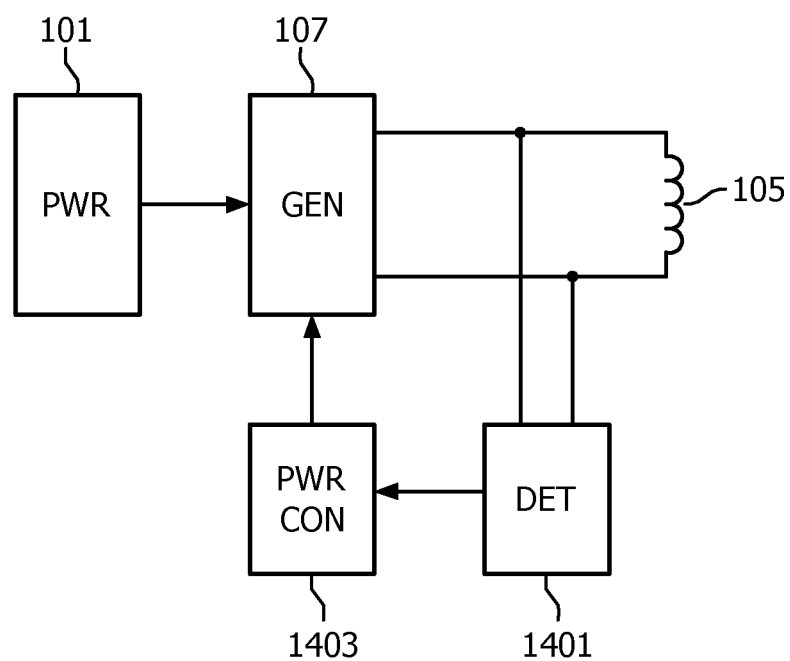
FIG. 14 is an illustration of an example of a power transmitter for a wireless power transfer system in accordance with some embodiments of the invention.

An example of elements of such a power transmitter is shown in FIG. 14. The power transmitter may specifically correspond to the power transmitter previously described, e.g. with reference to FIG. 8, but with functionality for detecting whether the thermal barrier is present.

Thus, the power transmitter comprises a power source 103 and a power signal generator 107 which specifically may be an inverter generating a sufficiently high frequency signal from the provided power signal. The power signal generator 107 is coupled to a transmit coil 105. Thus, the power signal generator 107 generates a drive signal and feeds it to the transmit coil/inductor 105.

In addition, the power transmitter comprises a detector 1401 which is arranged to detect the presence of a thermal barrier close to the transmit coil 105. In the example, the detector 1401 is coupled to the transmit coil 105 and is arranged to detect the presence of a thermal barrier by sensing a change in a characteristics for the transmit coil 105. Specifically, the detector 1401 may detect a change in impedance corresponding to the presence of the resonance circuit of the thermal barrier. Thus, in the example, the detector 1401 is arranged to detect the presence of the thermal barrier based on a property of the drive signal for the transmit coil 105. E.g. the detector 1401 may detect that the drive signal corresponds to an impedance with a specific characteristic over a certain frequency range corresponding to the effect of a resonance circuit in the thermal barrier.

However, it will be appreciated that any suitable approach for detecting a presence may be used. For example, the power transmitter and the thermal barrier may each comprise NFC or RFID transmitters/receivers and the presence of the thermal barrier may be detected by the possibility of establishing an NFC/RFID communication (which is inherently a short range communication) with the thermal barrier. In such embodiments, the communication may further exchange data, for example, the thermal barrier may communicate that it is indeed a thermal barrier and possibly may also communicate various characteristics or properties of the thermal barrier.

Thus, in some embodiments, the detector is arranged to detect the presence of the thermal barrier in response to detecting a communication signal originating from the thermal barrier. In other embodiments, the signal may potentially not be a communication signal but may e.g. be a weak unmodulated signal which can be detected by the power transmitter. E.g. the presence of a carrier signal may indicate that a thermal barrier is present.

The detector 1401 is coupled to a power controller 1403 which is further coupled to the power signal generator 107. The power controller 1403 is specifically arranged to control the maximum power of the drive signal to the transmit coil 105 and accordingly is arranged to control how much power may be provided to the power receiver.

In the power transmitter of FIG. 14, the power controller 1403 is arranged to restrict a power of the wireless inductive power signal generated by the transmit coil 105 to a lower level when a thermal barrier has not been detected than when it has been detected. Thus, the maximum power level of the generated power transfer signal is lower when there is no thermal barrier detected than when there is. Specifically, the power controller 1403 may restrict the maximum power level to a substantially lower level when there is no thermal barrier present and only allow high power when the power transmitter is sure that there is a thermal barrier present providing thermal resistance.

This may in many scenarios provide an efficient approach for preventing damage to the power transmitter surface (i.e. the worktop in the specific example) since the power may be restricted to safe levels that are insufficient to cause a heating appliance to heat up to potentially damaging levels. However, it may at the same time provide power to low power devices, and may automatically adapt to allow high power heating with the use of a thermal barrier.

The approach may be particularly suitable for scenarios wherein the thermal barrier is not part of the powered appliance.

Indeed, as previously mentioned, the thermal barrier with the power repeater may be an integral part of the powered appliance. However, in scenarios where the powered appliance does not include a thermal barrier, a thermal barrier in the form of a coaster with a power repeater may provide a very useful alternative. In such a scenario, the coaster may contain means to be detected and/or identified by the power transmitter or appliance in order to assure the presence of the thermal barrier. The coaster may further contain means to control the power transmitter and a user interface.

The approach may control the delivered power accordingly. In particular, the power transmitter may only provide maximum power if the presence of a coaster is detected. Therefore, the coaster may contain a feature that can be detected and/or identified by the power transmitter. Such means may be intrinsically realized by the existence of the resonance circuit in the coaster. E.g. in case the power transmitter detects an appliance without resonance circuit, it may conclude that no coaster is present. From a safety point of view this could mean that the power transmitter may only provide (full) power if it detects a resonance circuit.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example shall not be construed as limiting the scope of the claims in any way.

The invention claimed is:

1. A thermal barrier for a wireless power transfer system, the thermal barrier comprising:
    a first surface area for coupling to a power receiver to be powered by a first electromagnetic signal;
    a second surface area for coupling to a power transmitter providing a second electromagnetic signal;
    a power repeater comprising a resonance circuit including an inductor and a capacitor, the power repeater being arranged to generate the first electromagnetic signal by concentrating energy of the second electromagnetic signal towards the first surface area;
    a receiver for receiving a temperature measurement; and
    a controller for controlling a first level of the first electromagnetic signal by adapting a property of the resonance circuit, the controller being arranged to reduce the first level to a second level for increasing values of the temperature measurement, wherein the second level is less than the first level and is non-zero.

2. The thermal barrier of claim 1 wherein the controller is arranged to compare the temperature measurement to a temperature threshold, and to reduce the first level if the temperature measurement exceeds the temperature threshold.

3. The thermal barrier of claim 1 wherein the controller is arranged to restrict the first level to not exceed a maximum allowable level, and to reduce the maximum allowable level in response to an increasing value of the temperature measurement.

4. The thermal barrier of claim 3 wherein the controller is arranged to compare the temperature measurement to a temperature threshold, and to set the maximum allowable level to lower value when the temperature measurement exceeds the temperature threshold than when the temperature measurement does not exceed the temperature threshold.

5. The thermal barrier of claim 4 wherein the maximum allowable level when the temperature measurement exceeds the temperature threshold is no more than 10% of the maximum allowable level when the temperature measurement does not exceed the temperature threshold.

6. The thermal barrier of claim 1 wherein the controller is arranged to reduce the level by changing a resonance frequency of the resonance circuit to differ more from at least one of a frequency of the second electromagnetic signal, a resonance frequency of a resonance circuit of a power transmitter, and a resonance frequency of a resonance circuit of the power receiver for increasing values of the temperature measurement.

7. The thermal barrier of claim 1 wherein the receiver is arranged to receive the temperature measurement from the power receiver.

8. The thermal barrier of claim 1 further comprising a temperature sensor arranged to generate the temperature measurement as indicative of a temperature of the first surface area.

9. The thermal barrier of claim 1 wherein the controller is arranged to change the property to reduce a ratio between a second level of the second electromagnetic signal and the first level for increasing values of the temperature measurement.

10. The thermal barrier of claim 1 wherein the controller is arranged to reduce the first level by reducing a magnetic flux density of the first electromagnetic signal for the first surface area relative to a magnetic flux density of the second electromagnetic signal for the second surface area for increasing values of the temperature measurement.

11. The thermal barrier of claim 1 wherein the property is a resonance frequency.

12. The thermal barrier of claim 11 wherein the controller is arranged to change the resonance frequency by at least one of short circuiting the capacitor and disconnecting the capacitor from the inductor.

13. The thermal barrier of claim 1 further comprising a receiver coupled to the controller and arranged to receive control data from the power receiver; and wherein the controller is arranged to adapt the property in dependence on the control data.

14. The thermal barrier of claim 1 further comprising a user interface coupled to the controller and arranged to receive a user input; and wherein the controller is arranged to adapt the property in dependence on the user input.

15. The thermal barrier of claim 1 wherein the controller is arranged to adapt a resonance frequency of the resonance circuit to match a frequency of the second electromagnetic signal.

16. The thermal barrier of claim 1 further comprising a communication unit arranged to transmit data to the power transmitter by modifying a property of the resonance circuit, and a user interface for receiving a user input; and wherein the communication unit is arranged to generate data in dependence on the user input and at least one parameter measured by the thermal barrier.

* * * * *